United States Patent
Harpole

(10) Patent No.: US 7,381,131 B1
(45) Date of Patent: Jun. 3, 2008

(54) EXTENDABLE AUGER CONVEYOR

(76) Inventor: Danny J. Harpole, 2143 Highway 91 West, Jonesboro, AR (US) 72404

(*) Notice: Subject to any disclaimer, the term of this patent is extended or adjusted under 35 U.S.C. 154(b) by 0 days.

(21) Appl. No.: 11/458,483

(22) Filed: Jul. 19, 2006

(51) Int. Cl.
*A01D 17/02* (2006.01)
*A01F 12/46* (2006.01)

(52) U.S. Cl. .................. 460/114; 198/671; 414/526

(58) Field of Classification Search ............ 198/671, 198/674, 550.2, 550.1; 414/526, 502, 326; 460/114; 56/16.6
See application file for complete search history.

(56) References Cited

U.S. PATENT DOCUMENTS

| | | | |
|---|---|---|---|
| 2,615,587 A | 10/1952 | Beyer | |
| 2,845,167 A * | 7/1958 | Heiken | 198/660 |
| 3,605,995 A * | 9/1971 | Maack | 198/660 |
| 4,691,818 A * | 9/1987 | Weber | 198/666 |
| 5,004,095 A * | 4/1991 | Lapeyre et al. | 198/660 |
| 5,099,985 A * | 3/1992 | Lapeyre | 198/658 |
| 5,409,344 A * | 4/1995 | Tharaldson | 414/505 |
| 5,538,388 A | 7/1996 | Bergkamp | |
| 6,012,272 A | 1/2000 | Dillon | |
| 6,125,618 A | 10/2000 | Dillon | |
| 6,233,911 B1 * | 5/2001 | Dillon | 56/14.6 |
| 6,261,050 B1 * | 7/2001 | Kuhns | 414/526 |
| 6,339,917 B1 | 1/2002 | Dillon | |
| 6,606,844 B2 * | 8/2003 | Dillon et al. | 56/14.6 |
| 6,908,380 B2 | 6/2005 | Silver | |
| 6,910,845 B2 | 6/2005 | Dillon | |

FOREIGN PATENT DOCUMENTS

| | | | |
|---|---|---|---|
| JP | 2000262140 A * | 9/2000 | |
| JP | 2003052235 A * | 2/2003 | |

* cited by examiner

*Primary Examiner*—Árpád Fábián Kovács

(57) ABSTRACT

An extendable auger conveyor including a screw thread sleeve snugly and slidably receiving a rotary drive shaft having a non-round cross section, both housed within a pair of telescoping sections of a casing having an infeed port intermediate the length of the supporting casing section.

19 Claims, 22 Drawing Sheets

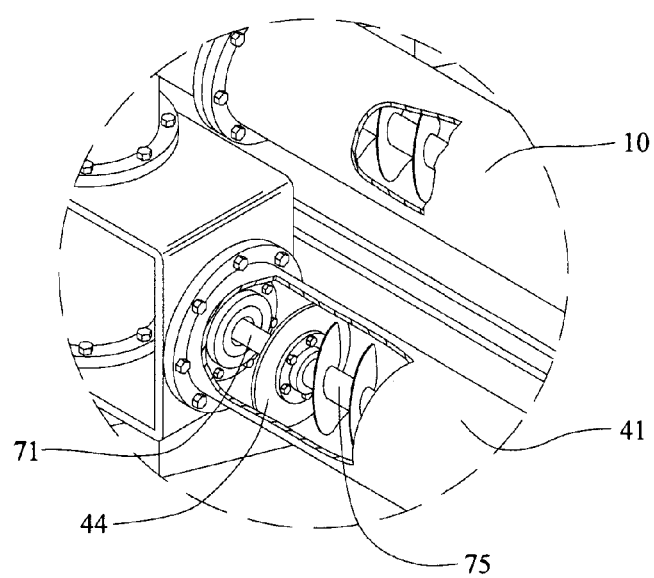
Fig. 4
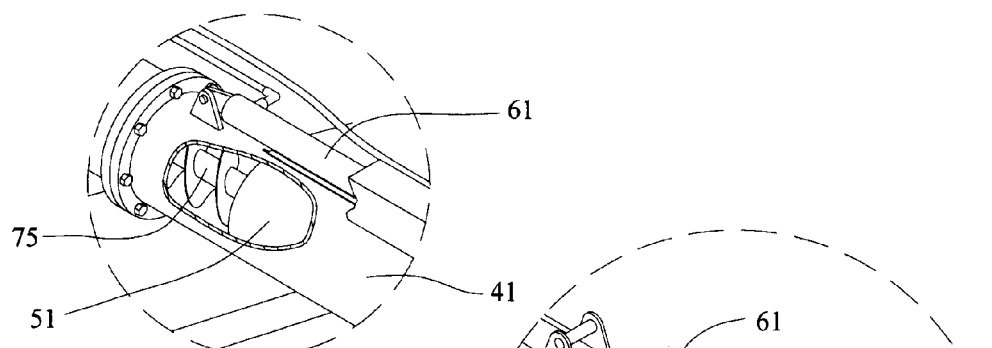
Fig. 3
Fig. 2
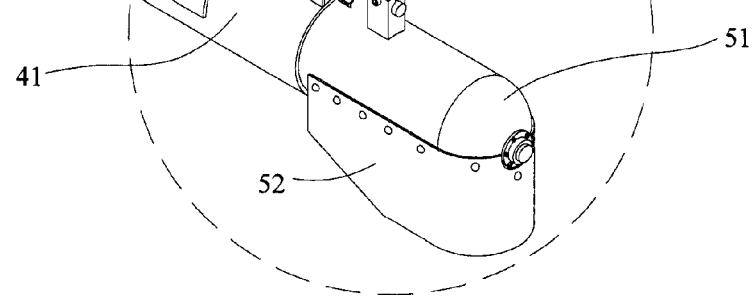

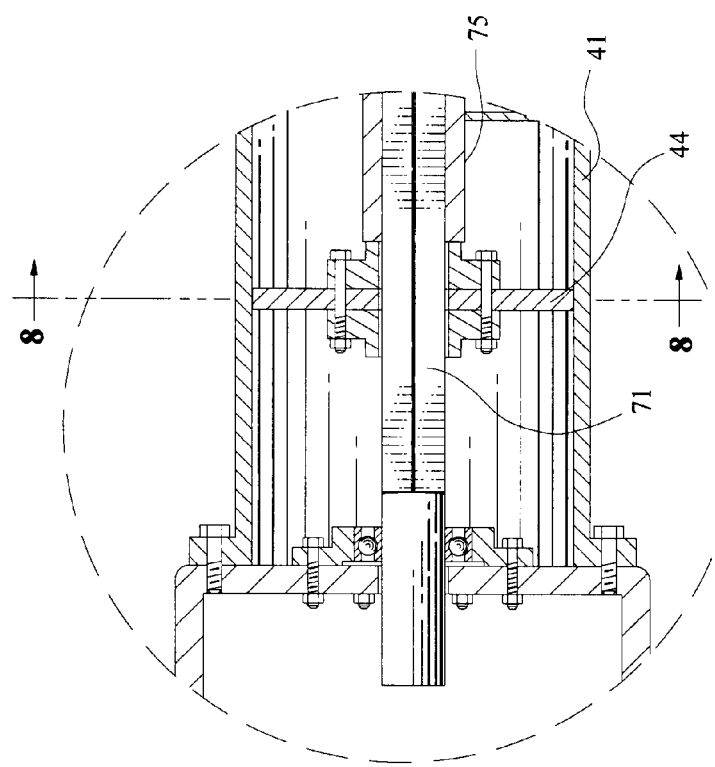
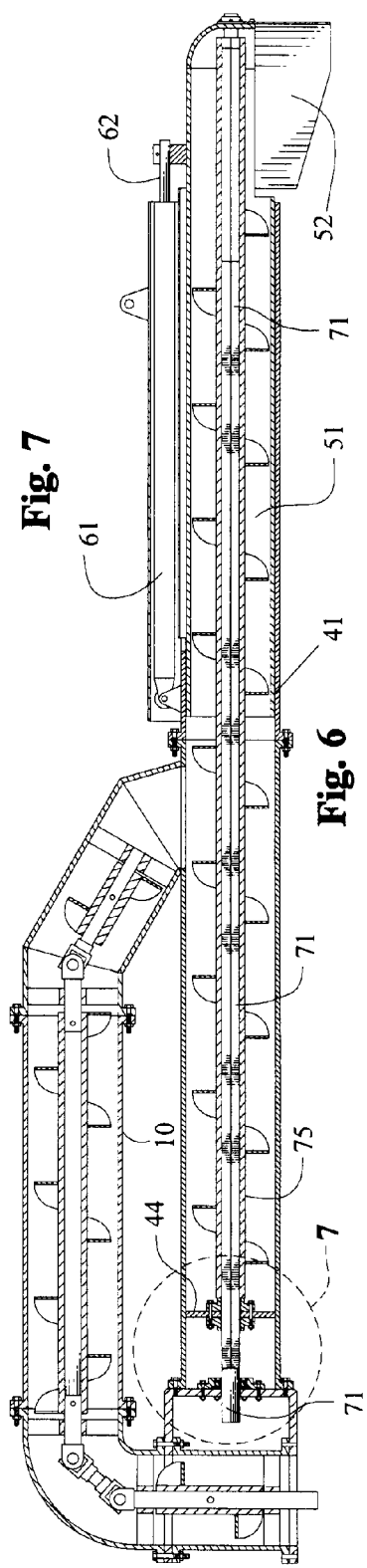
Fig. 7
Fig. 6
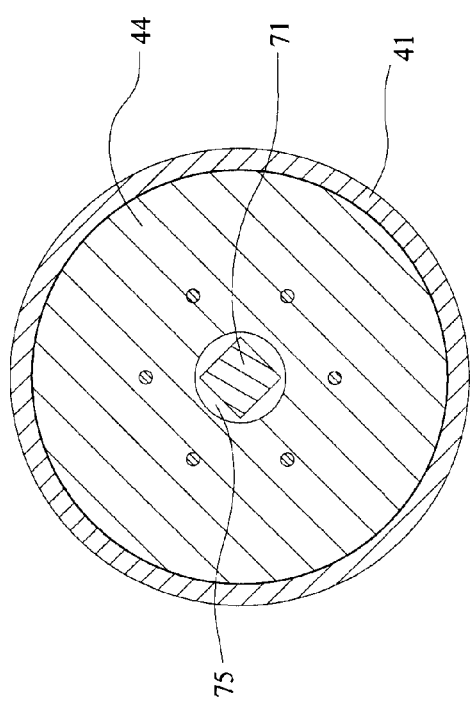
Fig. 8

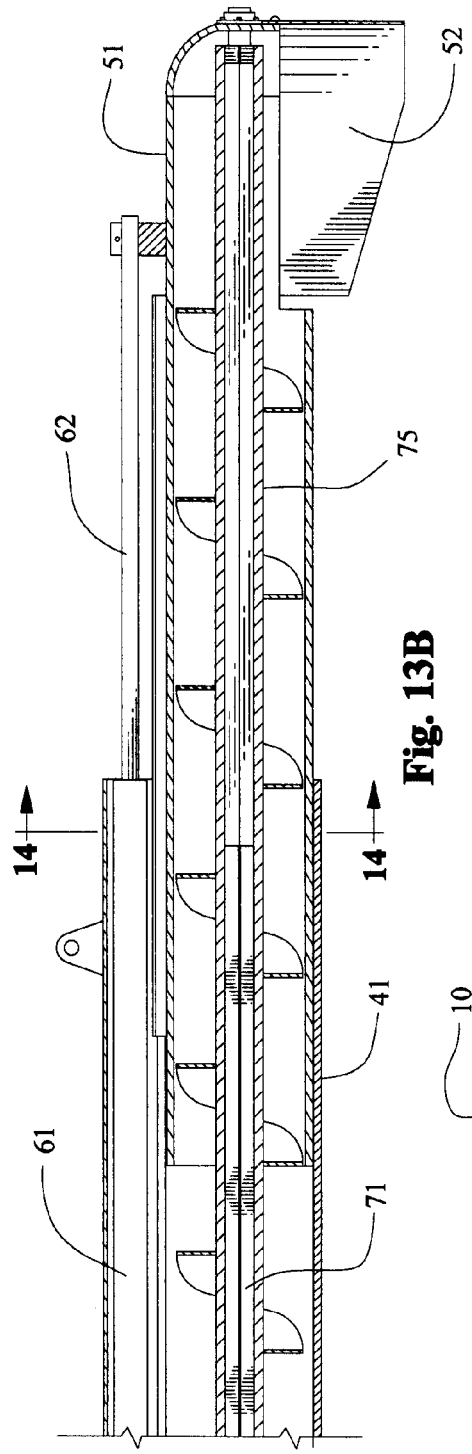
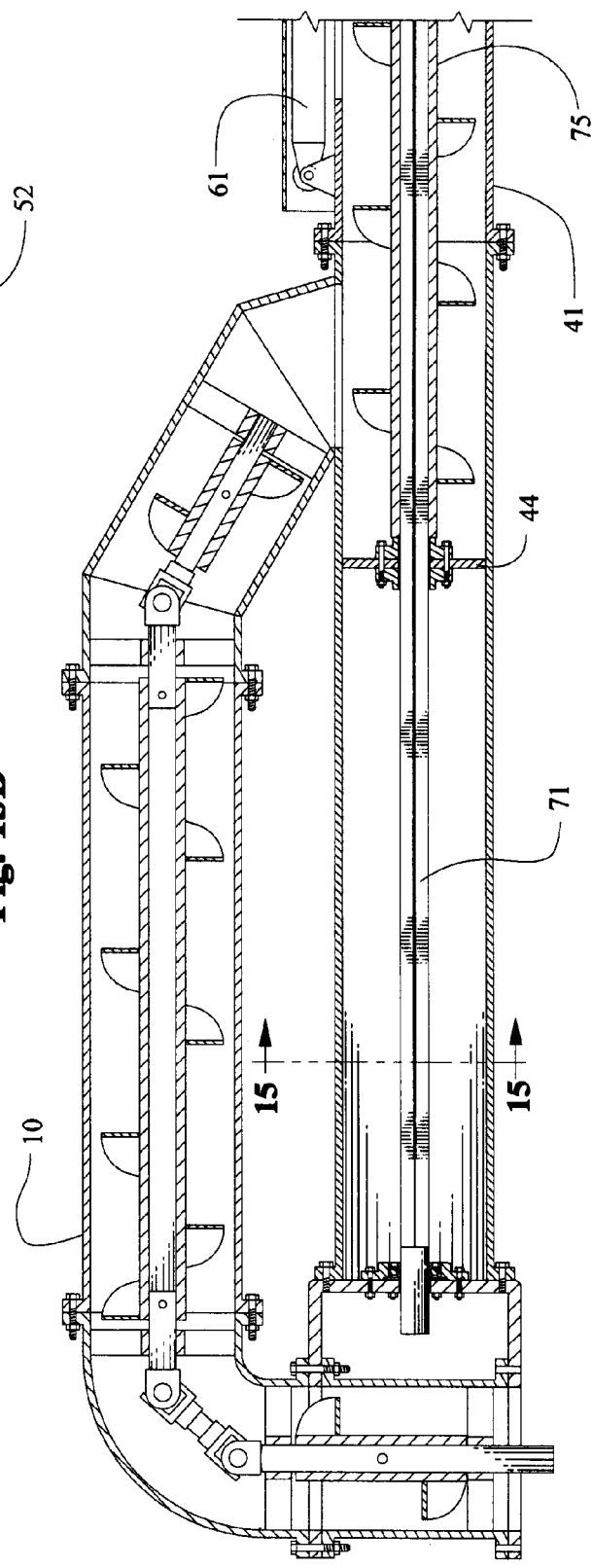
Fig. 13B
Fig. 13A

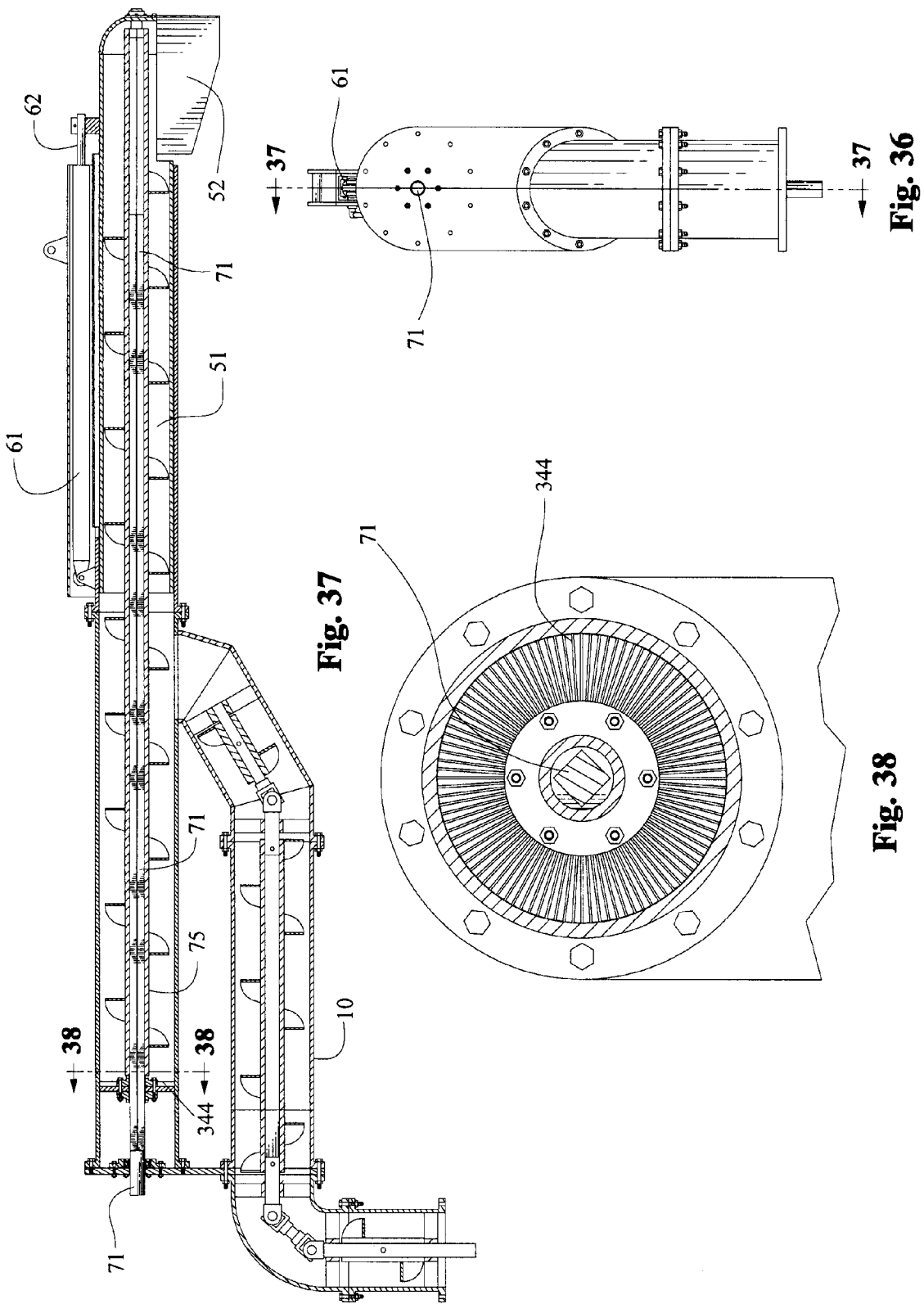

EXTENDABLE AUGER CONVEYOR

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION (1) Field of the Invention

This invention generally relates to conveyors capable of extending the distance of their conveyance. Although such conveyors are useful in a wide variety of industries and applications, they are especially useful in connection with combines such as those used to harvest grains.

The present invention is directed primarily towards an improvement facilitating auger conveyors, having a screw thread auger encased in a casing; more specifically in the context of harvesting combine auger conveyors, a casing such as telescopically slidable tubes, to extend the exit port a distance needed to offload grain bin contents into transport vehicles or storage facilities.

(2) Description of Related Art Including Information Disclosed 37 CFR 1.97 and 1.98

There are many different known combine conveyor arrangements, for conveying grain or other harvests into a bin or other collection/storage area, and then into a transport vehicle. Specialized helical shaped devices such as screw thread augers are well known for the transport of various types of bulk material. Such conveyors generally include a helical shaped member which rotates within a housing or trough such that rotation of the screw thread along its longitudinal or central axis results in movement of the bulk material along the length of the device. In the past, such conveyors were typically constructed from metal, and each conveyor was specifically designed for a particular purpose and of a particular length. However, although most prior art conveyors were specifically designed to meet a particular application, there have been some attempts of providing a modular type conveyor of metal and wood. Examples of United States patents which disclose such conveyors include U.S. Pat. No. 349,233 issued to James Nelson on Sep. 10, 1886; U.S. Pat. No. 455,384 issued to H. Binkholz on Jul. 7, 1891; U.S. Pat. No. 525,194 issued to J. 35 Dyson, et al on Aug. 20, 1894, U.S. Pat. No. 546,879 issued to J. Dyson, et al on Sep. 14, 1895; U.S. Pat. No. 1,867,573 issued to D. G. Leach on Jul. 19, 1932; U.S. Pat. No. 2,492,915 issued to A. B. Carlson on Dec. 27, 1949; U.S. Pat. No. 3,648,826 issued to Dean P. Brooks 40 on Mar. 14, 1972 and U.S. Pat. No. 3,705,644 issued to Claude E. Kawchitch on Dec. 12, 1972.

Known in the art are the following, arguably related to the patentability of the present invention:

| U.S. Pat. No. | 1st Inventor Named | Patent Issue Date |
|---|---|---|
| 2,615,587 | Beyer | Oct. 28, 1952 |
| 2,845,167 | Heiken | Jul. 29, 1958 |

-continued

| U.S. Pat. No. | 1st Inventor Named | Patent Issue Date |
|---|---|---|
| 4,691,818 | Weber | Sep. 8, 1987 |
| 5 409,344 | Tharaldson | Apr. 25, 1995 |
| 5,538,388 | Bergkamp | Jul. 23, 1996 |
| 6,012,272 | Dillon | Jan. 11, 2000 |
| 6.125,618 | Dillon | Oct. 3, 2000 |
| 6,233,911 | Dillon | May 22, 2001 |
| 6,339,917 | Dillon | Jan. 22, 2002 |
| 6,606,844 | Dillon | Aug. 19, 2003 |
| 6,908,380 | Silver | Jun. 21, 2005 |
| 6,910,845 | Dillon | Jun. 28. 2005 |

U.S. Pat. No. 2,845,167 issued to Heiken discloses a combine conveyor having a pair of telescoping tubes, each enclosing a segment of axle (having a rectangular cross section) carrying its own segment of screw thread auger; between both axle/auger sections is an auger-less segment of axle telescopically received within the adjacent axle segments, the auger attached to the outermost segment spiraling inwardly past its outermost segment (and over the auger-less middle segment) to bridge the gap between the outermost axle/auger segment and the innermost axle/auger segment. Neither of the axle/auger segments slides within its respective section of tube. The combined length of the innermost and outermost auger segments depends upon the amount of overlap of the screw threads of the two auger segments; adjustment is accomplished by disengaging the axle train from the power drive, then manually rotating the axle train (with a secondary wheel) while the power pulley wheel is held against rotation, thereby shortening or lengthening the overlap or meshing of the two screw threads as they are screwed on unscrewed relative to each other. The Heiken patent does not disclose a hydraulic cylinder (or similar power-driven mechanical linkage) causing an extendable section of tube/auger to either extend the spout end outward or retract the spout inwardly, or a grain entrance toward the middle of the support tube rather than at its beginning.

U.S. Pat. No. 4,691,818 issued to Weber discloses a modularly extendable screw thread conveyor having a drive shaft (with non-circular cross section) extendable by axially joining additional segments (by telescopic alignment). Also included are screw thread modules that slide over those drive shaft segments; the end of one screw thread aligns with the beginning of the next screw thread module, preventing overlapping to form an uninterrupted screw thread. Adjustment of the length of the conveyor is limited to module increments, and it cannot occur without disassembling the drive train. The Weber patent does not disclose a hydraulic cylinder (or similar power-driven mechanical linkage) causing an extendable section of tube/auger to either extend the spout end outward or retract the spout inwardly, or a grain entrance toward the middle of the support tube rather than at its beginning.

U.S. Pat. No. 6,233,911 issued to Dillon discloses a combine having a second conveyor system slidably adjustable relative to a first supporting conveyor system, but not with the housing for the second conveyor being telescopically received within the housing for the first supporting conveyor, extension is adjustable by a rack and pinion mechanism or a rod and cylinder assembly. The first supporting conveyor may be an auger, having its vertical elevation (angulation) adjusted by a hydraulic cylinder. With respect to the version having an auger as the first supporting conveyor, this patent notes problems concerning support for the second conveyor, and hypothesizes that guy wires and other (non-disclosed) means of supporting the weight may be designed and implemented depending upon the needs. Neither does this patent disclose a grain entrance toward the middle of the support tube rather than at its beginning, nor does it disclose an axle having a non-round cross section, and an auger screw thread snugly impaled by that axle but capable of sliding up and down that axle.

Another U.S. patent issued to Dillon, U.S. Pat. No. 6,606,844, discloses a grain unloading assembly comprising a conveyor belt extending back and forth (between 5 pulley wheels) within an outer tube (having a spout) telescopically received with an inner support tube; extension and retraction of the two tubes is accomplished by a motorized rack and pinion mechanism. This Dillon patent does not disclose a grain entrance toward the middle of the support tube rather than at its beginning, nor does it disclose an axle having a non-round cross section, and an auger screw thread snugly impaled by that axle but capable of sliding up and down that axle.

BRIEF SUMMARY OF THE INVENTION

The present invention is an improvement for essentially facilitating the extension of a screw thread auger axially outward on a drive shaft, without weakening the drive shaft or the screw thread portion of the auger. In general, the extendable auger conveyor includes two telescoping sections of tubing or other casing, one section providing support and rotary drive to the other section, providing extension and conveyance by a screw thread auger. The extendable section of casing has an outermost exit end, that essentially holds the outermost end of the encased screw thread auger and allows it to rotate axially; the support section of the casing has an inner end encasing the mechanical linkage of the rotary drive shaft extending outward within the casing toward the exit end of the extendable section of casing. Significantly, the drive shaft has a non-circular cross section, and the screw thread is essentially a hollow sleeve having a central cavity with a cross section corresponding to that of the drive shaft, so that it snugly receives the drive shaft when one section of casing is telescopically received within the other section of casing. Accordingly, even though extension of the extendable section outward from the support section of casing essentially slides the screw thread sleeve outward along the drive shaft, rotation of the drive shaft will nonetheless rotate the screw thread sleeve.

Another significant feature of the invention is the infeeding of transportable items (such as grain) to the screw thread auger further outward along the casing than traditionally done. Accordingly, the transportable items will be introduced to the screw thread auger even after extension of the auger (by the sliding of the screw thread sleeve outward along the drive shaft). Ideally when the conveyor is in its fully retracted configuration (essentially with the support and extendable sections of casing maximally overlapping, and virtually the entire length of drive shaft received within the screw thread sleeve), the transportable items are introduced approximately one-third the distance out from the most inward end of screw thread; when the conveyor is in its fully extended (telescoped out) configuration, there is still screw threading at the infeed port.

Another significant feature of the invention is a bearing collar essentially forming the innermost end of screw thread, supporting the inner end of screw thread sleeve. The bearing collar provides extra support for the screw thread sleeve when the extendable section of the casing (with its accompanying screw thread sleeve) slide outward along the drive shaft to extend the auger conveyor; the bearing collar also has two other notable functions, preventing backsliding of transportable items (especially when the conveyor is inclined diagonally), and essentially scouring a portion of the casing inner wall. The bearing collar is situated at a point where it will remain inward of the infeed port when the conveyor is in its fully extended (telescoped out) configuration.

The invention described herein may be used with most (if not all) existing combines or similar machines having a conveyor system from a bin or holding area, usually conveying transportable items to another conveyor system (such as a vertical transport conveyor) that often supplies transportable items to another conveyor system (such as the feeder conveyor of the present invention, feeding transportable items to the feeder port of the present invention). The invention described herein is specifically designed to interface with existing harvesting combines having a vertical conveyor such as a screw-thread auger, transporting items to the feeder conveyor of the present invention.

One primary object of the present invention is to provide an improved extendable auger conveyor that retains most of the structural strength of non-extendable conveyors, and that is stronger and more efficient than conveyors having segmented drive shafts and/or segmented screw thread portions.

Another primary object of the present invention is to provide an improved extendable auger conveyor that may be extended without disassembling the drive train or conveyance train.

It is another object of the present invention to provide an improved extendable auger conveyor that may be extended without pre-set extension increments.

It is another object of the present invention to provide an improved extendable auger conveyor that may be extended or retracted while an associated vehicle (such as a combine) or the drive train of the conveyor are in motion.

It is another object of the present invention to provide a conveyor that readily retrofits an existing conveyor system.

Other objects will be apparent from a reading of the written description disclosed herein, together with the claims.

BRIEF DESCRIPTION OF THE SEVERAL VIEWS OF THE DRAWINGS

FIG. 2 depicts an enlarged partial cutaway view of the area in circle 2 of FIG. 1.

FIG. 3 depicts an enlarged partial cutaway view of the area in circle 3 of FIG. 1.

FIG. 4 depicts an enlarged partial cutaway view of the area in circle 4 of FIG. 1.

FIG. 6 depicts a longitudinal cross section of the left side elevation view of the invention of FIG. 1, sectioned at plane 6-6 of FIG. 5.

FIG. 7 depicts an enlarged partial view of the area in circle 7 of FIG. 6.

FIG. 8 depicts a cross section of the elevation view along plane 8-8 of FIG. 7.

FIG. 13A depicts partial view of a longitudinal cross section of the left side elevation view of the top-feeding version of the invention of FIG. 1 in its fully extended configuration, sectioned at plane 6-6 of FIG. 5.

FIG. 13B depicts the remainder of the version of the invention of FIG. 13A.

FIG. 36 depicts a rear elevation view of a version of the invention having an infeed port situated on the underside of the support section of casing.

FIG. 37 depicts a longitudinal cross section of the left side elevation view of the invention of FIG. 36, sectioned at plane 37-37 of FIG. 36.

FIG. 38 depicts a cross section of the elevation view of the invention of FIG. 37, along plane 38-38 of FIG. 37, the number and arrangement of bristles is reduced for illustration clarity purposes.

FIGS. 1 through 38 illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

Figure 1:
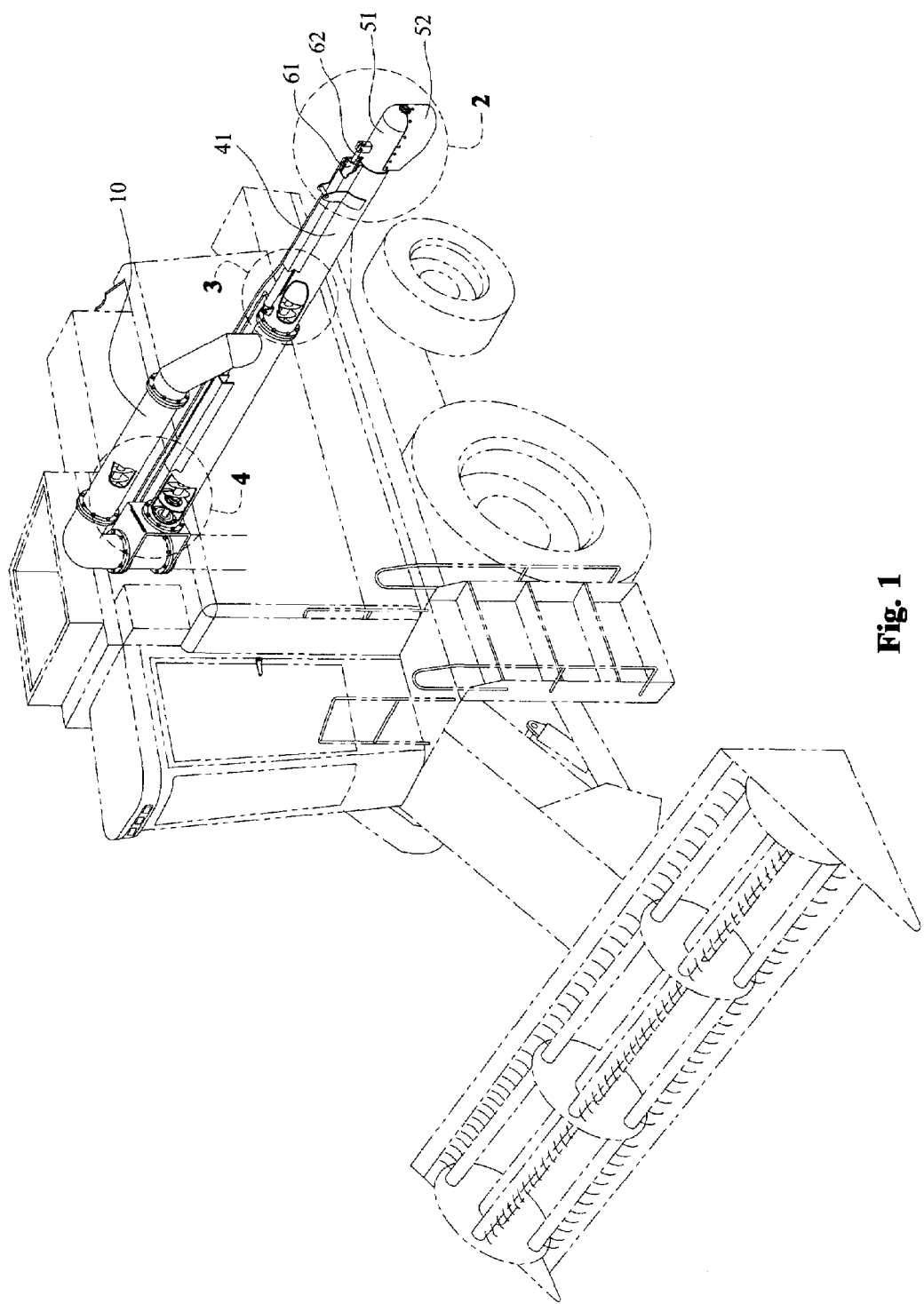
FIG. 1 depicts a perspective view of a top-feeding version of the invention in its fully retracted configuration (with most of the extendable section of the auger casing hidden, telescopically received within the support section of the auger casing), with a sample combine depicted in phantom. An enlargement of circle 2 is depicted in FIG. 2. An enlargement of circle 3 is depicted in FIG. 3. An enlargement of circle 4 is depicted in FIG. 4.
Figure 5:
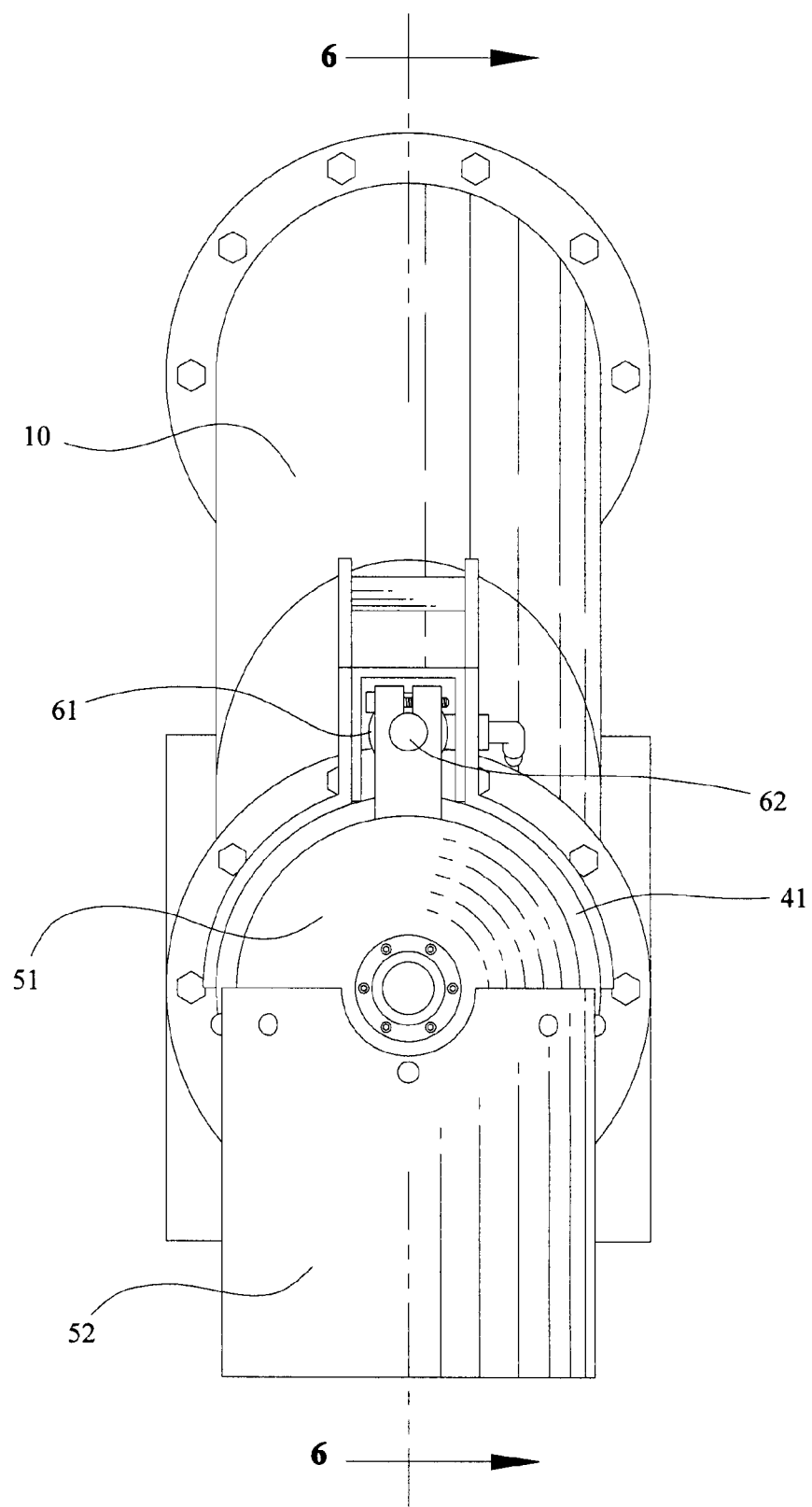
FIG. 5 depicts a front elevation view of the invention of FIG. 1.
Figure 9:
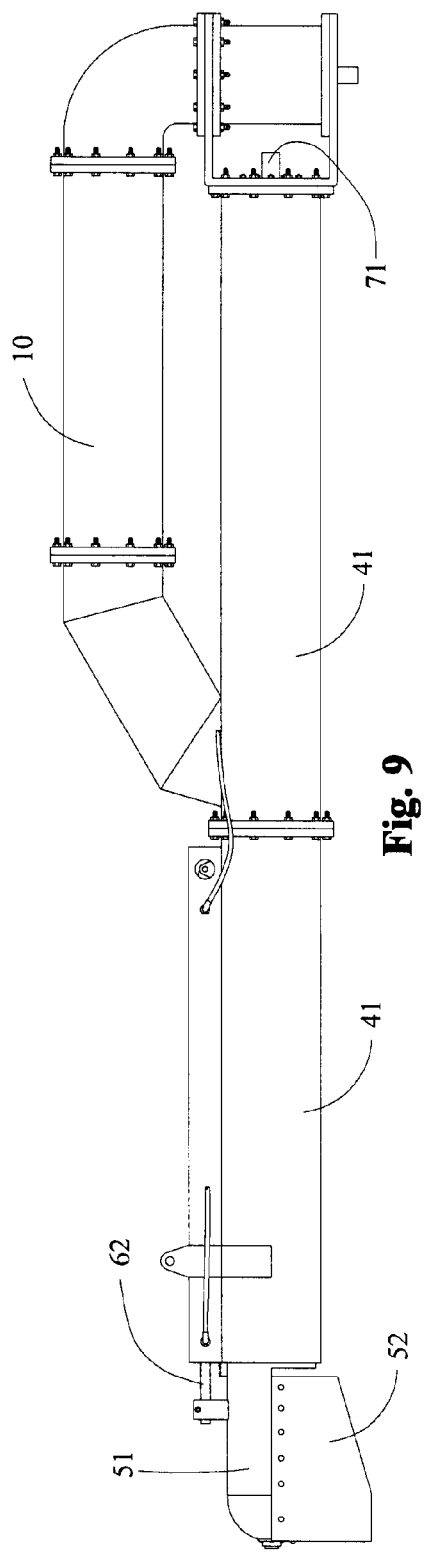
FIG. 9 depicts an elevation view of the right side of the invention of FIG. 1.
Figure 10:
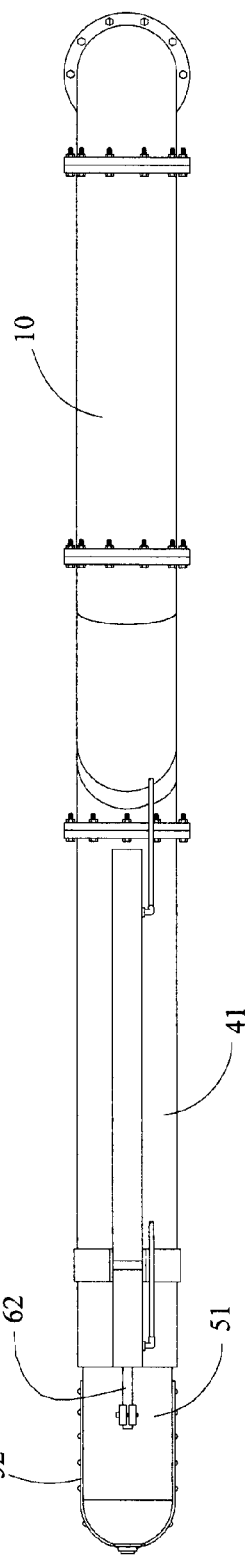
FIG. 10 depicts a top plan view of the invention of FIG. 1.
Figure 11:
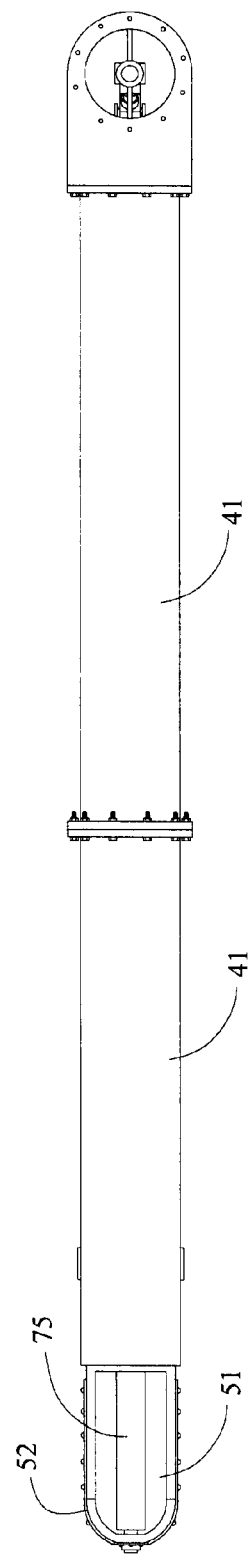
FIG. 11 depicts a bottom plan view of the invention of FIG. 1.
Figure 12:
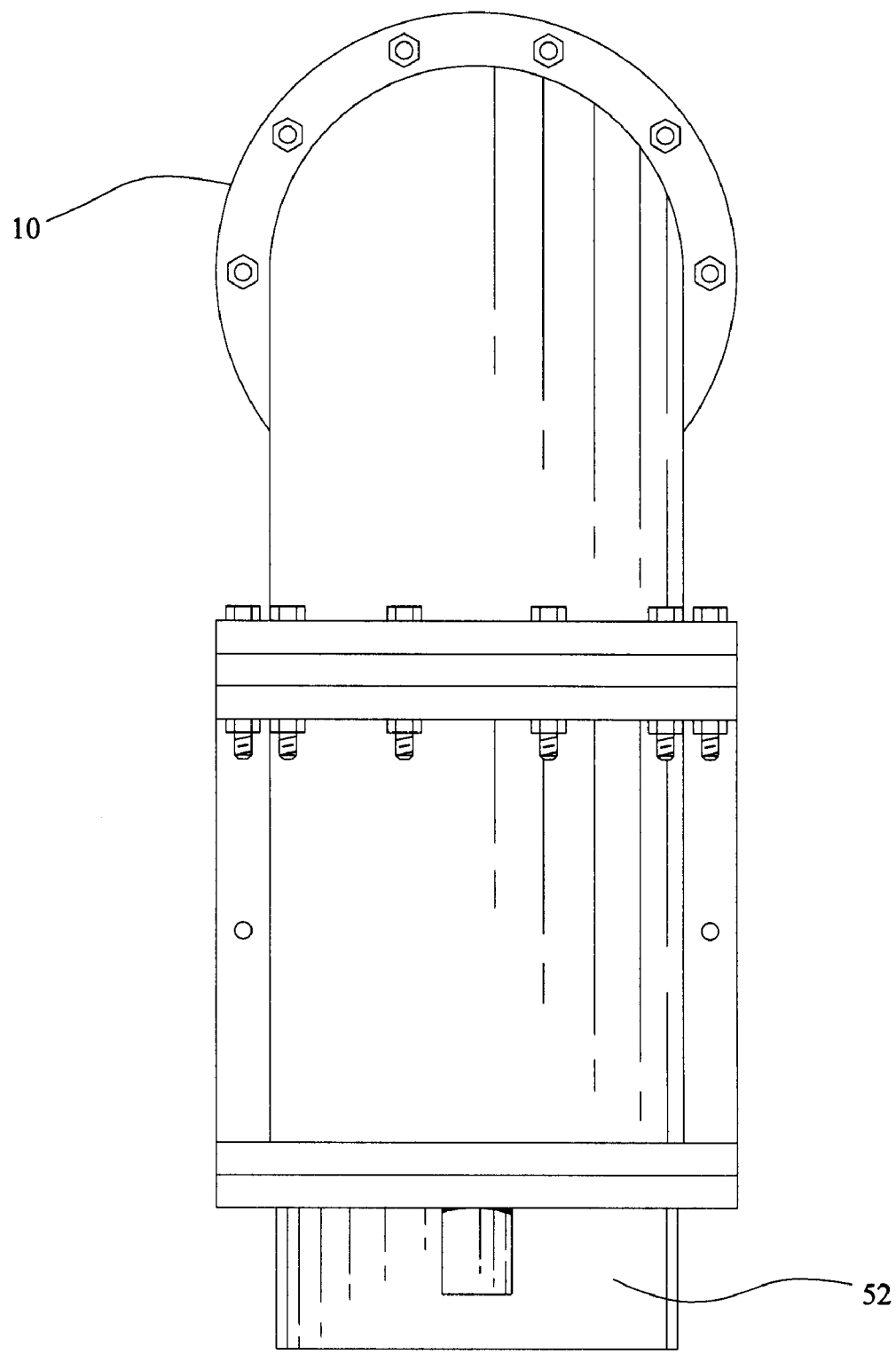
FIG. 12 depicts a rear elevation view of the invention of FIG. 1.
Figure 14:
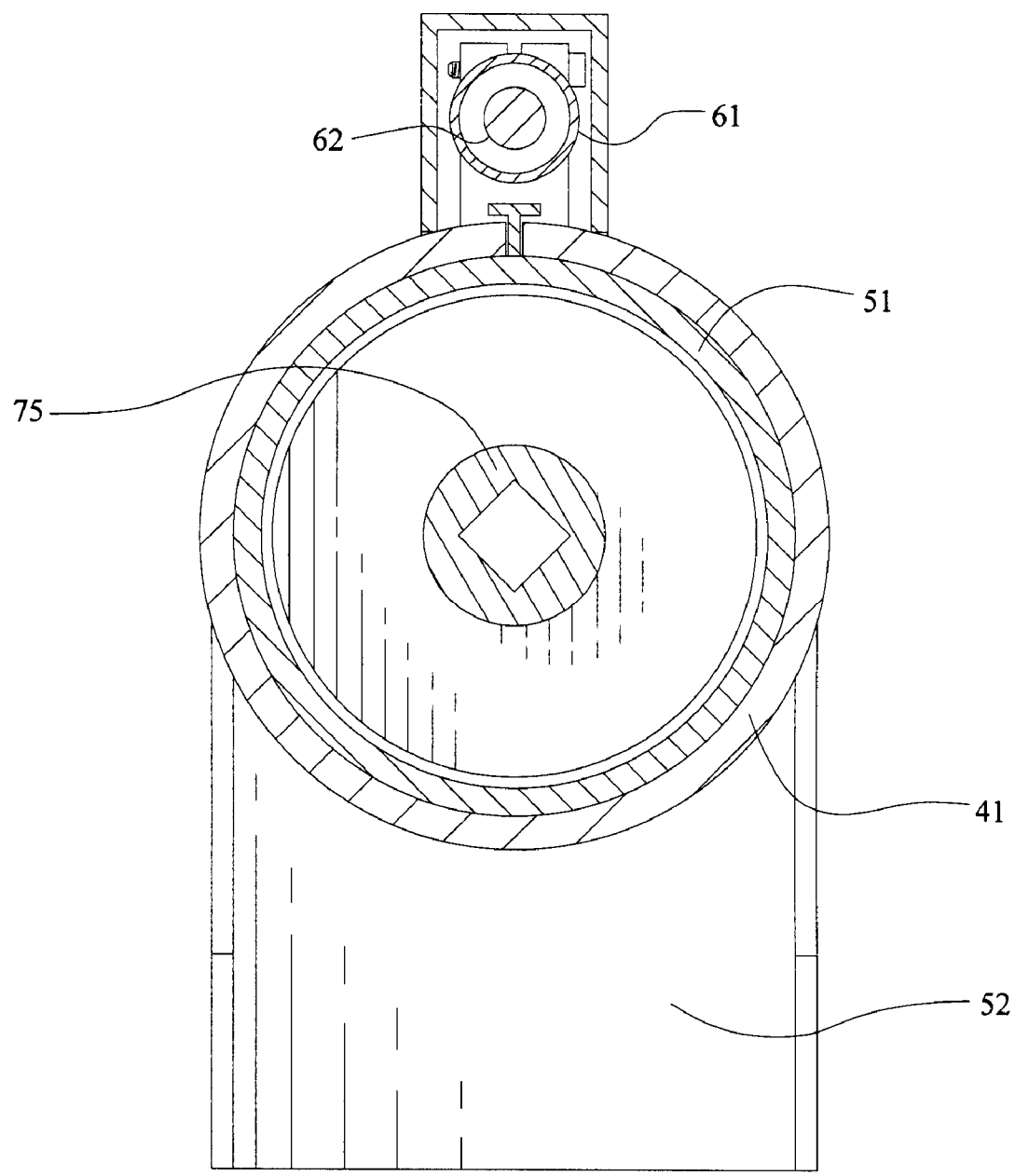
FIG. 14 depicts a cross section of the invention of FIG. 13B along plane 14-14 of FIG. 13B.
Figure 15:
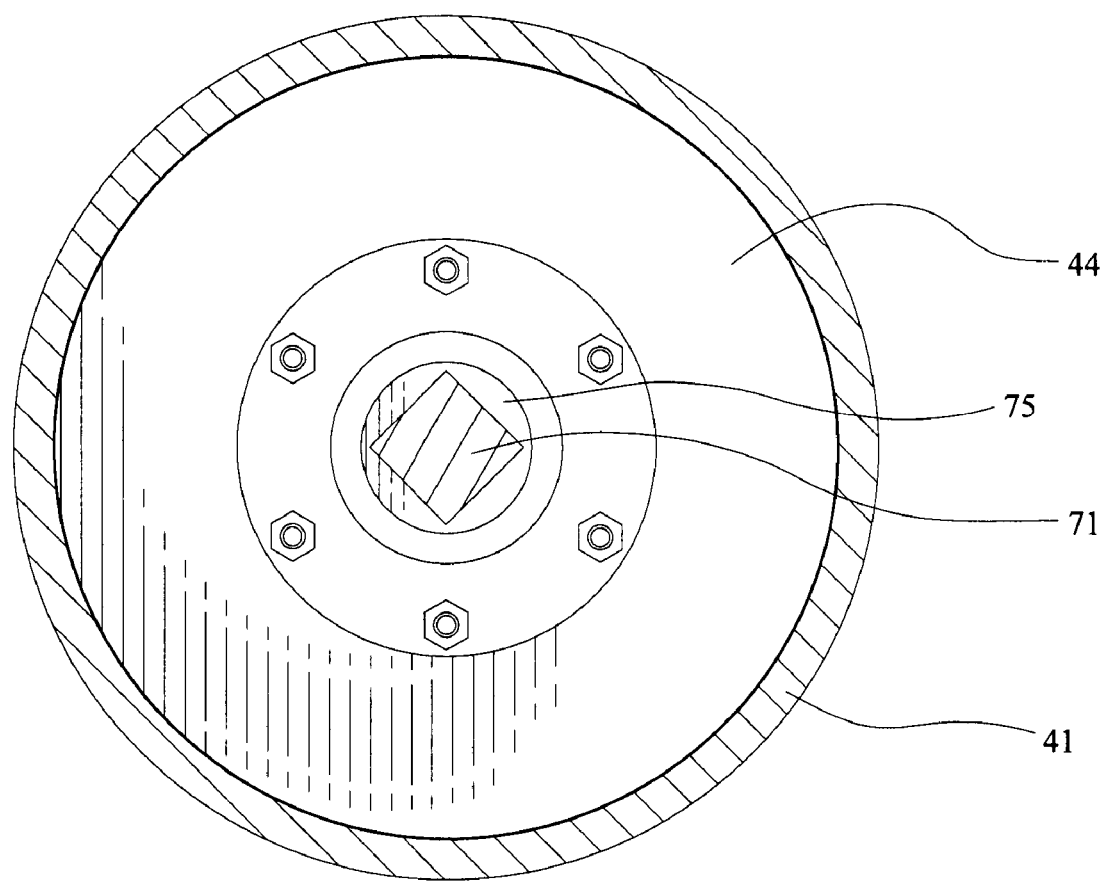
FIG. 15 depicts a cross section of the invention of FIG. 13A, sectioned at plane 15-15 of FIG. 13A.
Figure 16:
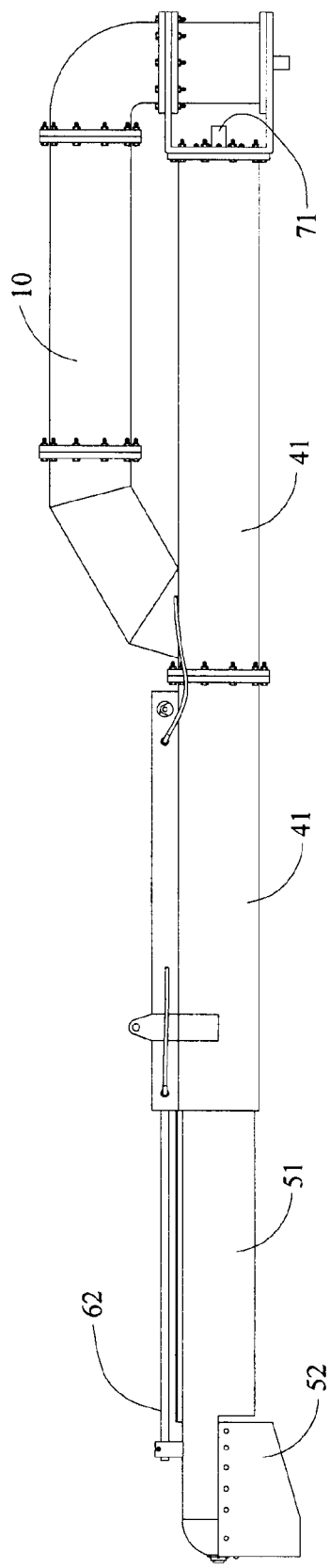
FIG. 16 depicts an elevation view of the right side of the invention of FIG. 13A and FIG. 13B.
Figure 17:
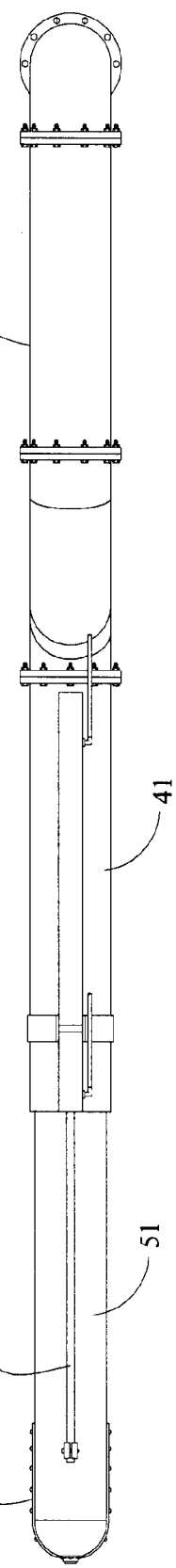
FIG. 17 depicts a top plan view of the invention of FIG. 13A and FIG. 13B.
Figure 18:
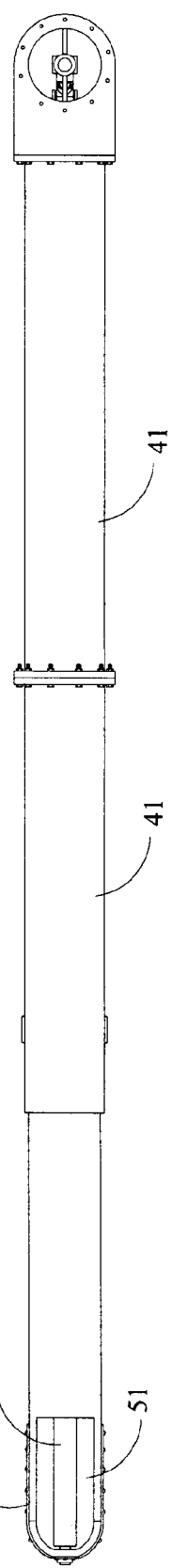
FIG. 18 depicts a bottom plan view of the invention of FIG. 13A and FIG. 13B.
Figure 19:
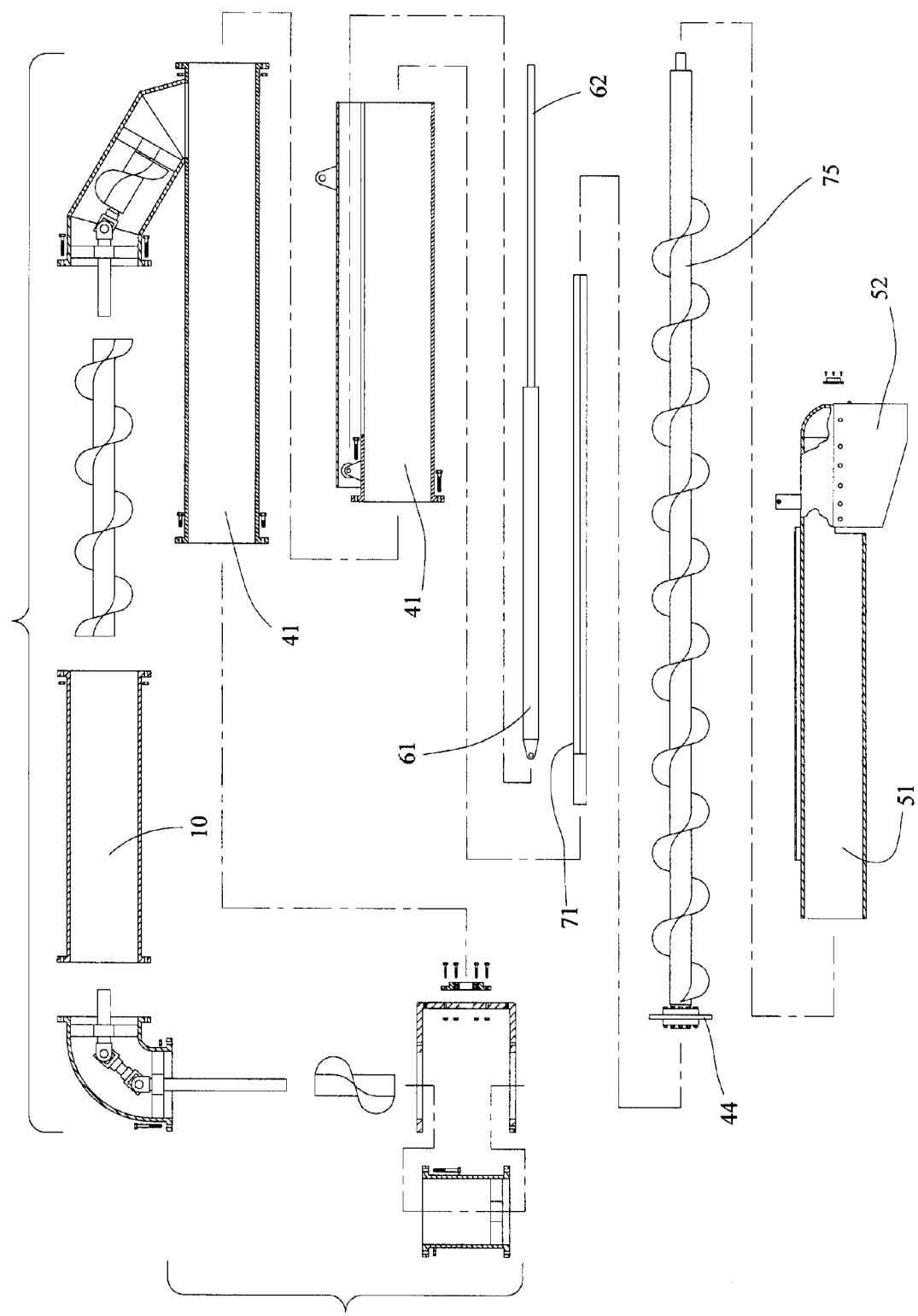
FIG. 19 depicts an exploded view of the invention of FIG. 1.
Figure 20:
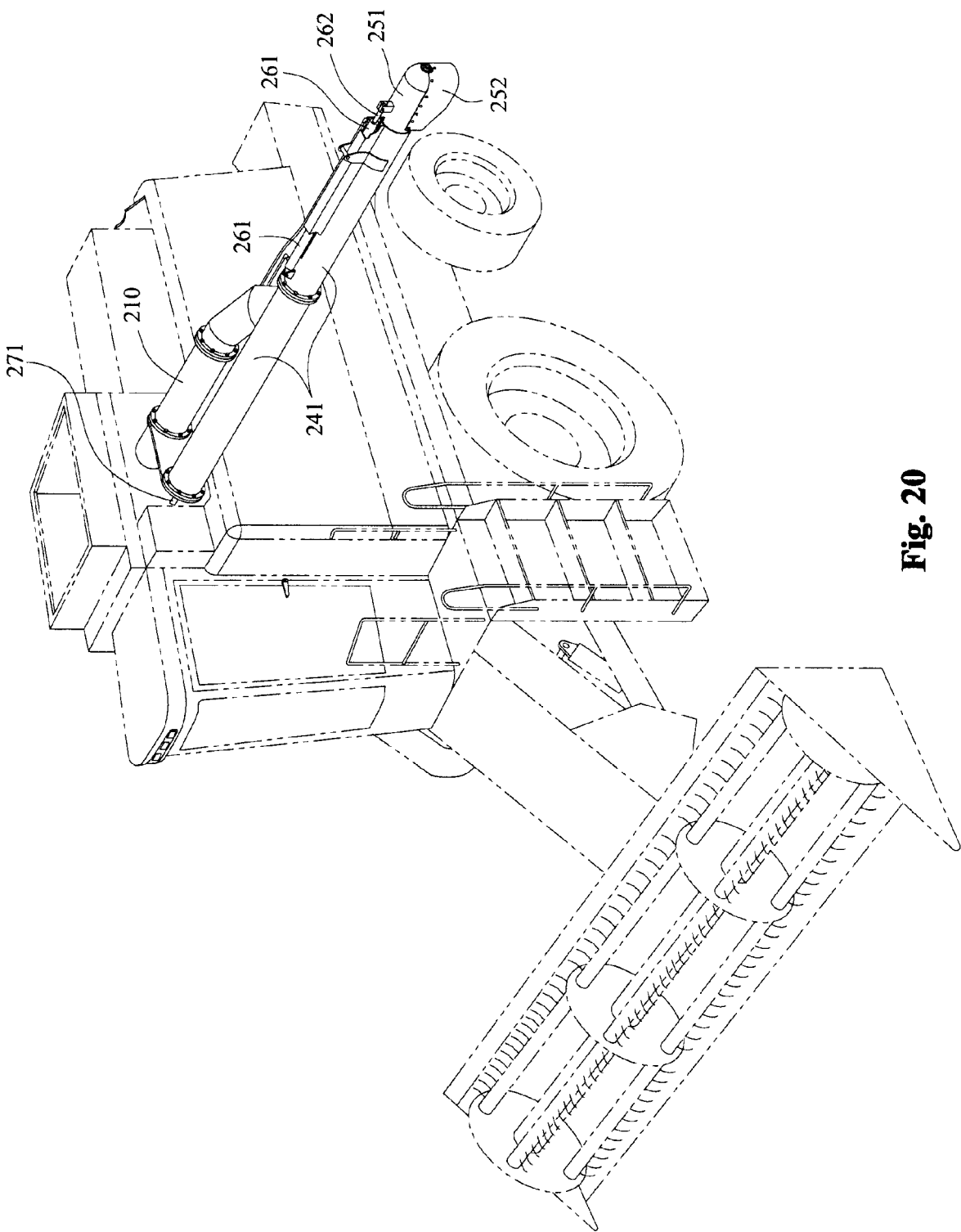
FIG. 20 depicts a perspective view of a right-feeding version of the invention in its fully retracted configuration (with most of the extendable section of the auger casing hidden, telescopically received within the support section of the auger casing), with a sample combine depicted in phantom.
Figure 21:
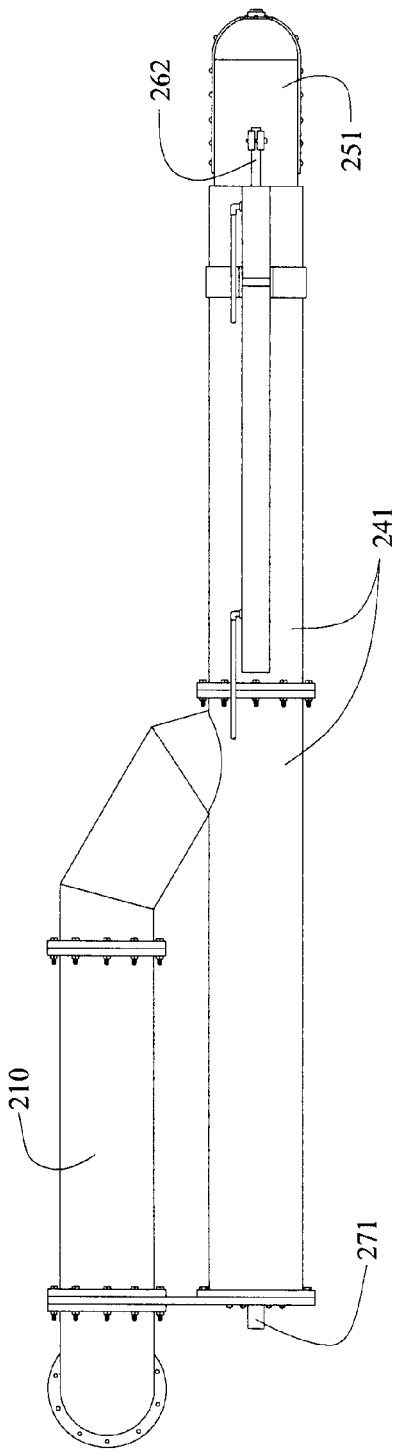
FIG. 21 depicts a top plan view of the invention of FIG. 20, in isolation.
Figure 22:
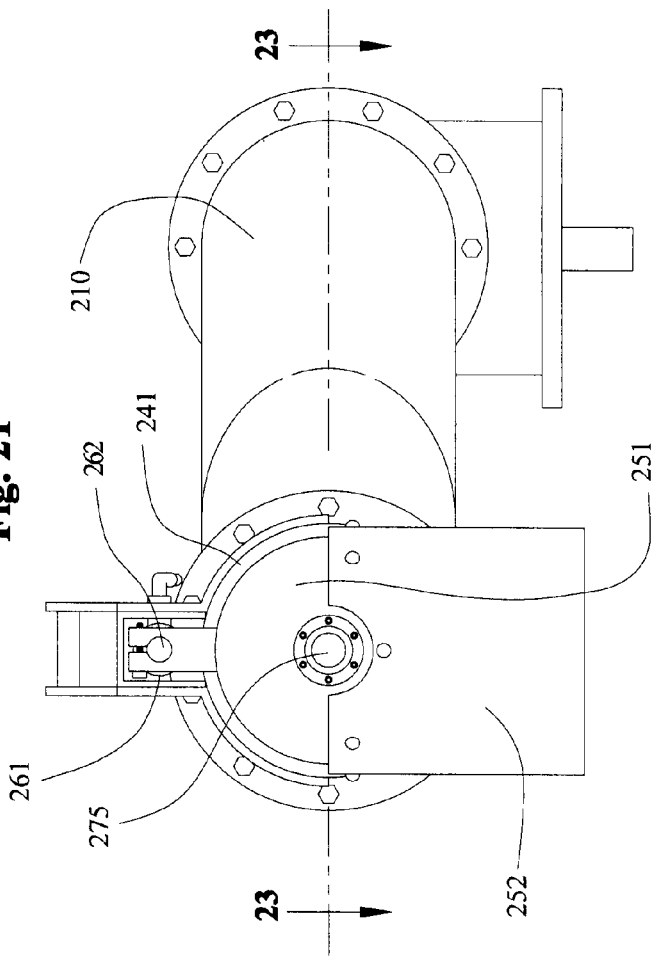
FIG. 22 depicts a front elevation view of the invention of FIG. 21.
Figure 24:
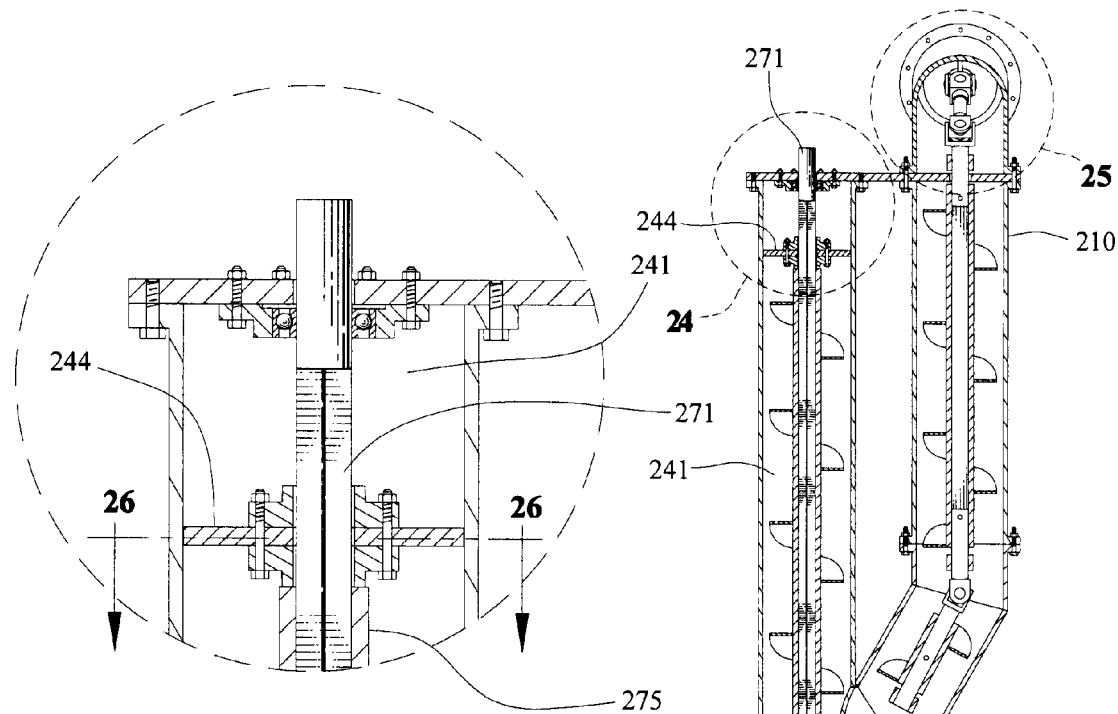
FIG. 24 depicts an enlarged partial cutaway view of the area in circle 24 of FIG. 23.
Figure 25:
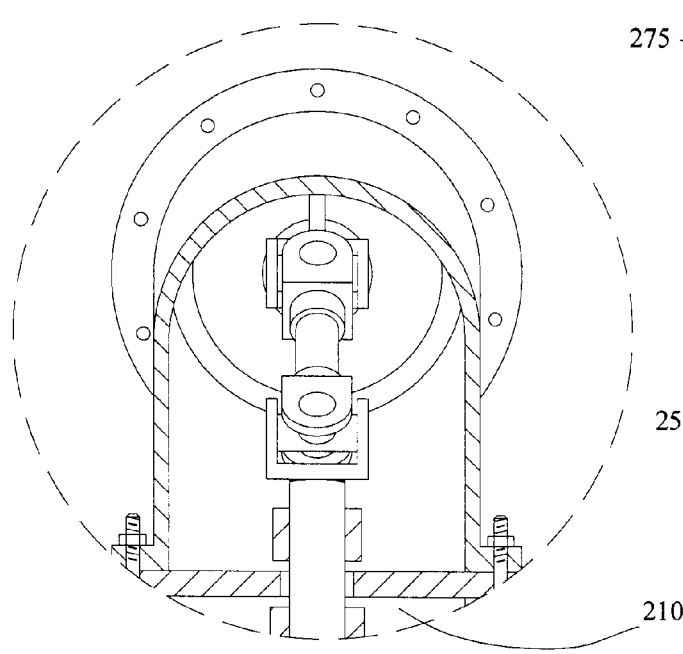
FIG. 25 depicts an enlarged partial cutaway view of the area in circle 25 of FIG. 23.
Figure 23:
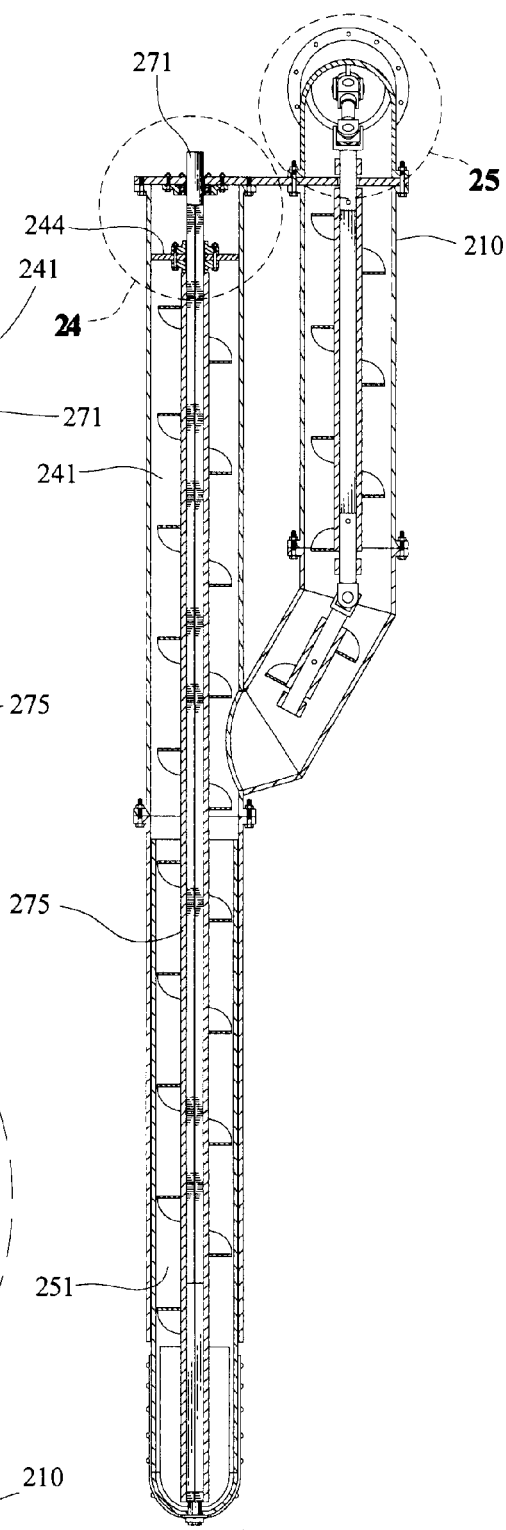
FIG. 23 depicts a longitudinal cross section of the invention of FIG. 21, sectioned at plane 23-23 of FIG. 22.
Figure 26:
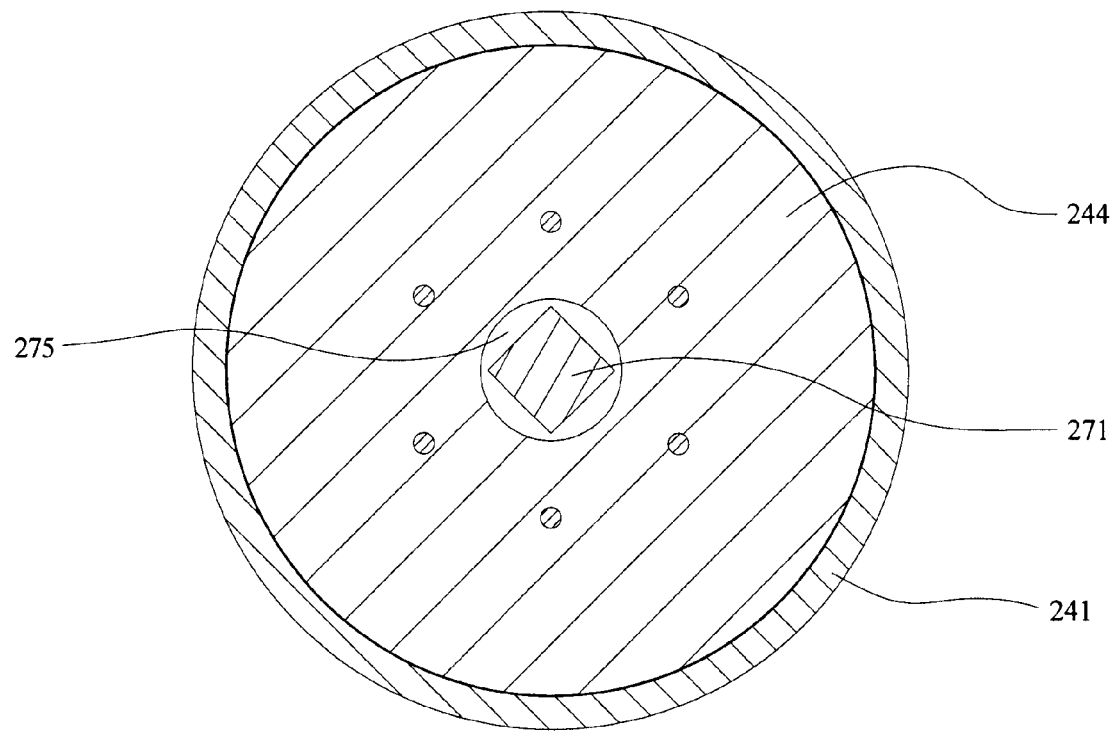
FIG. 26 depicts a cross section of the invention of FIG. 21, sectioned at plane 26-26 of FIG. 24.
Figure 27:
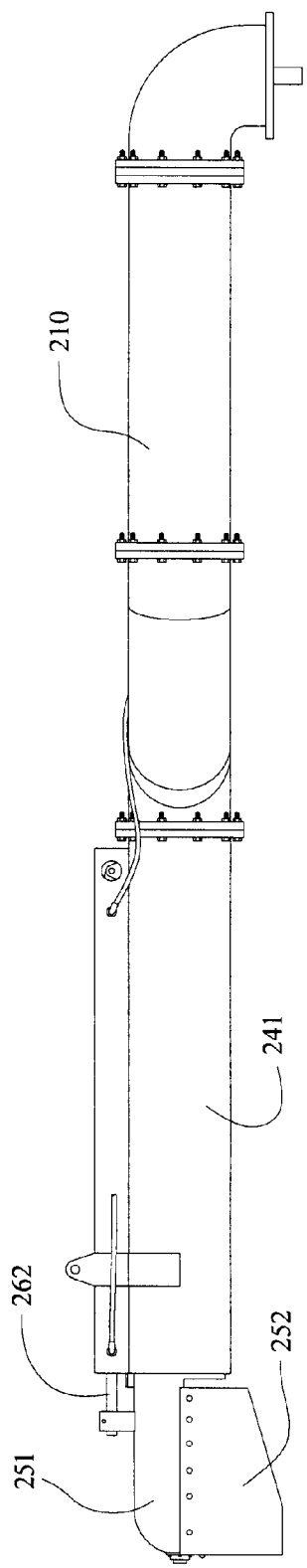
FIG. 27 depicts an elevation view of the right side of the invention of FIG. 21.
Figure 28:
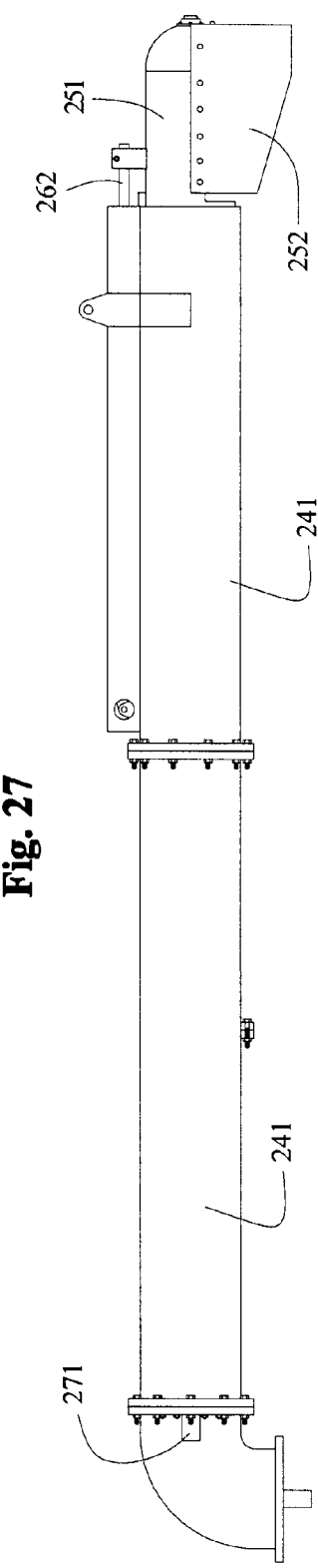
FIG. 28 depicts a left elevation view of the invention of FIG. 21.
Figure 29:
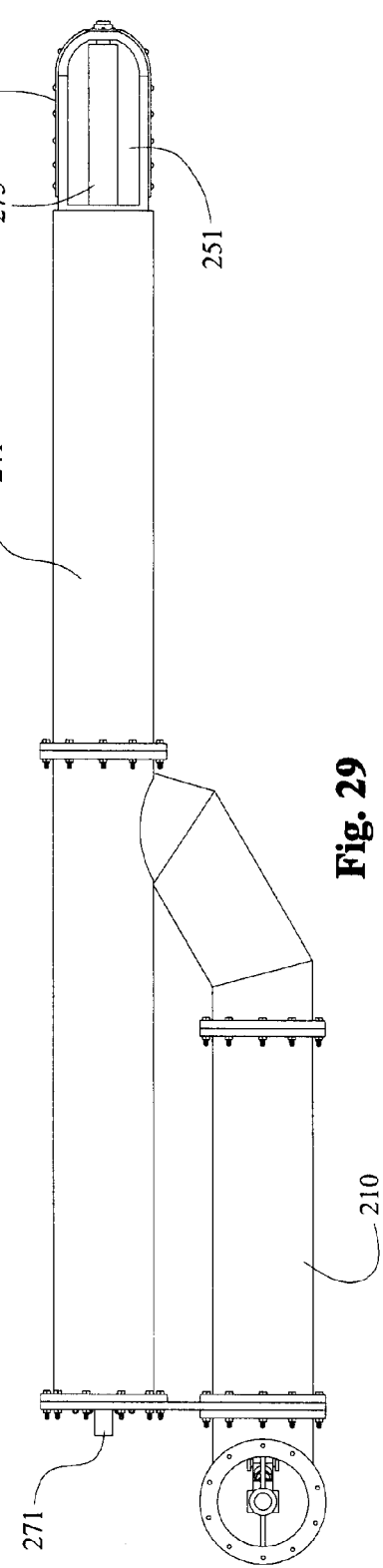
FIG. 29 depicts a bottom plan view of the invention of FIG. 21.
Figure 30:
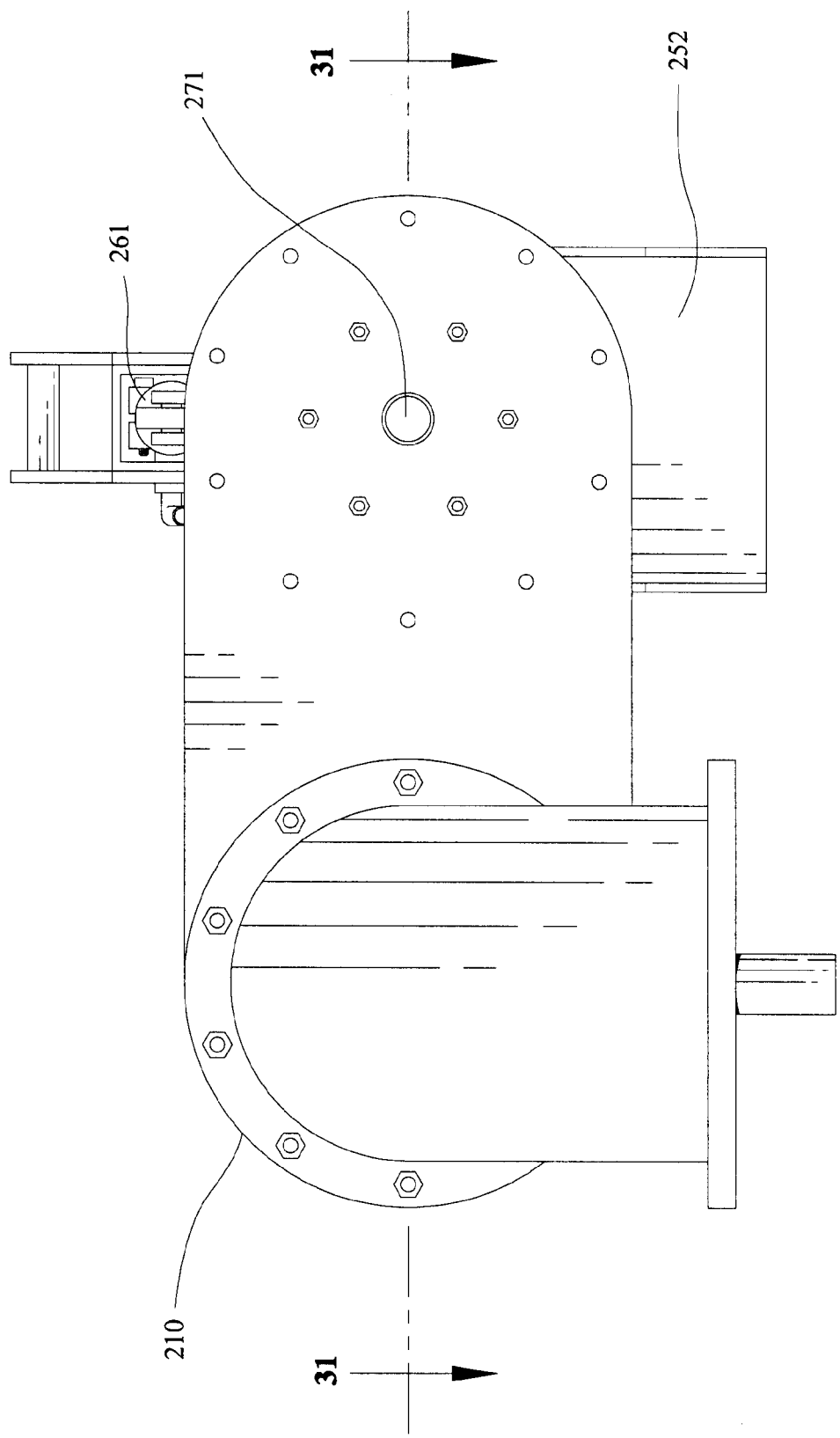
FIG. 30 depicts a rear elevation view of the invention of FIG. 21.
Figures 31A, 31B:
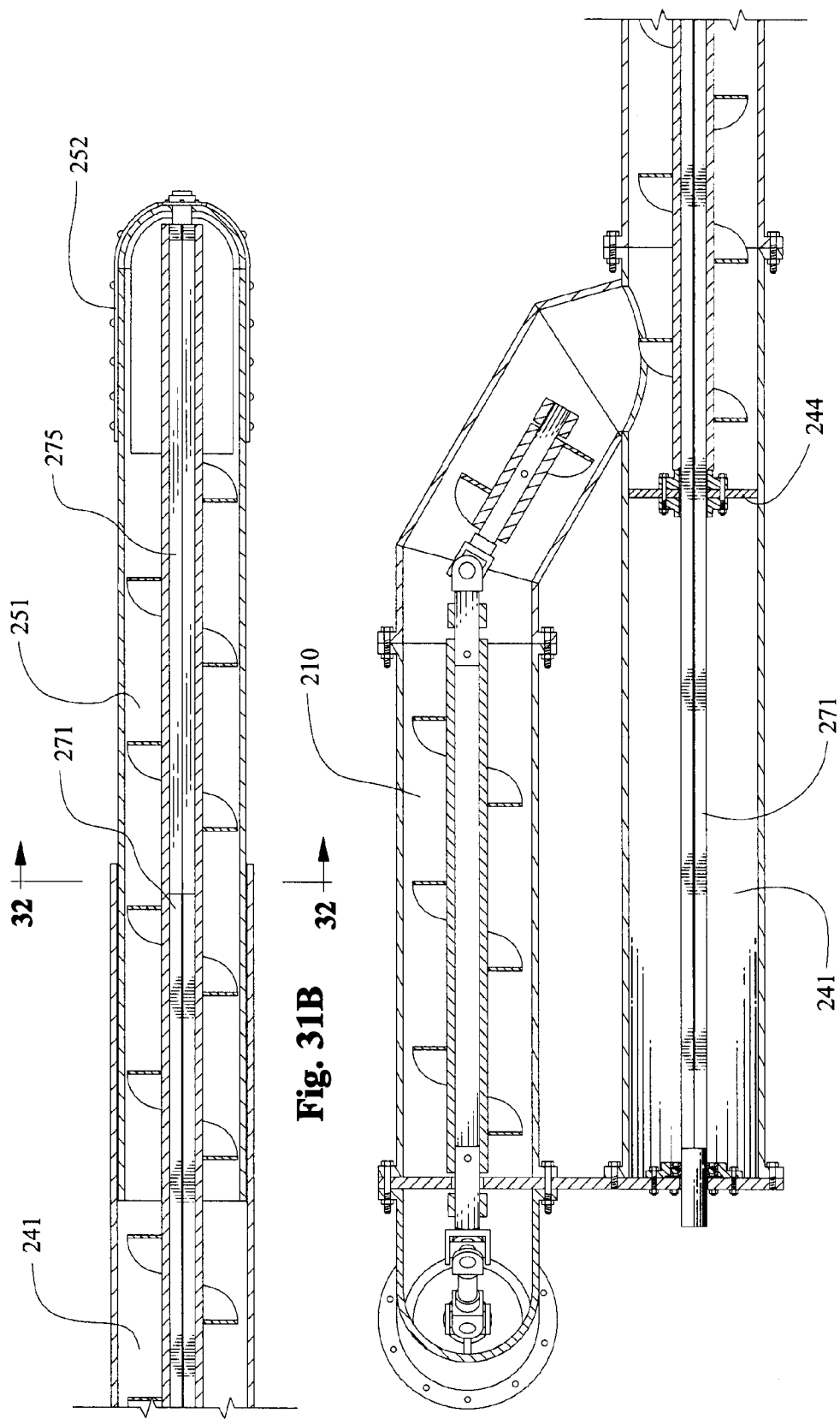
FIG. 31A depicts partial view of the invention of FIG. 23 in its fully extended configuration, sectioned at plane 31-31 of FIG. 30.
FIG. 31B depicts the remainder of the version of the invention of FIG. 31A.
Figure 32:
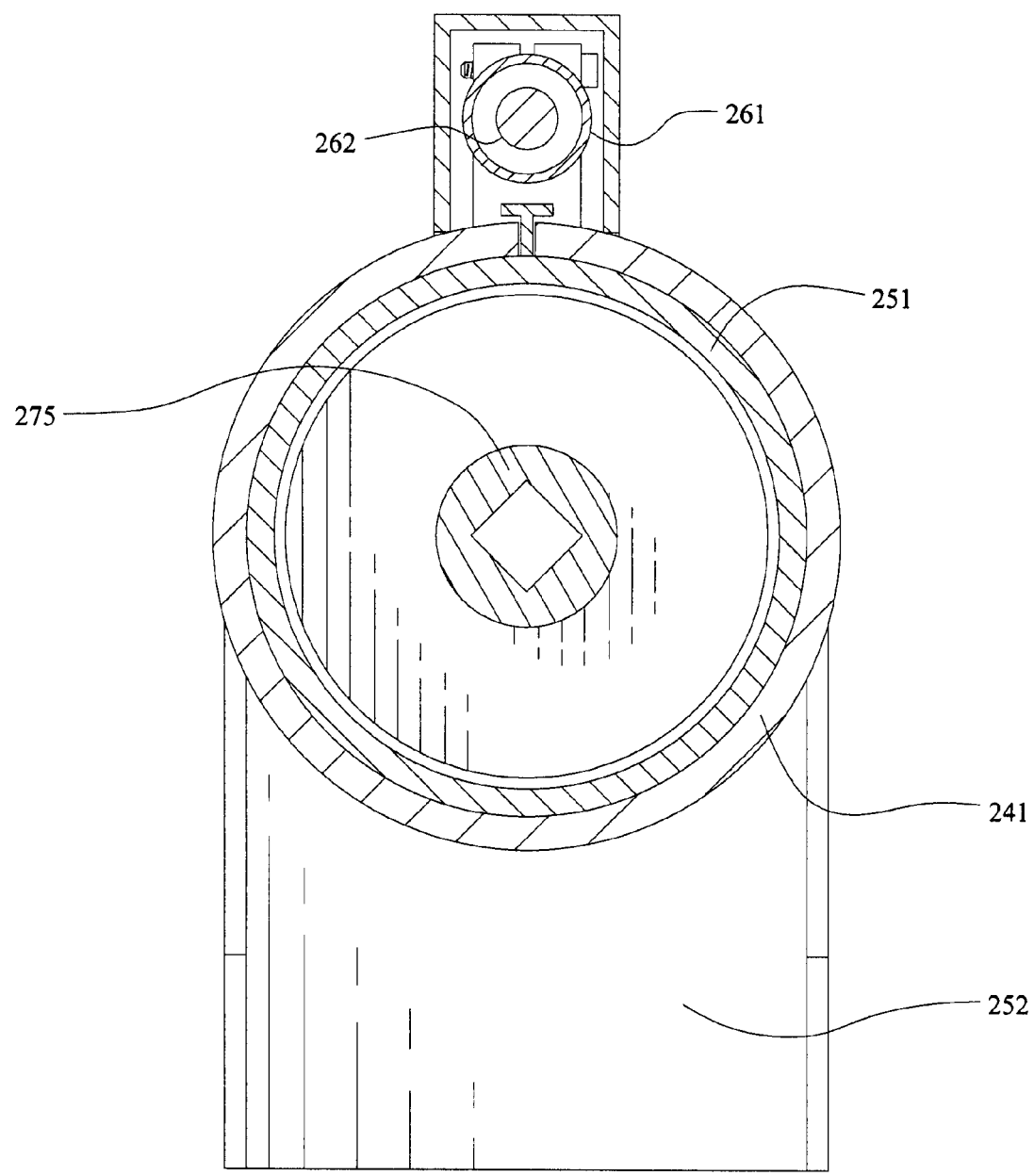
FIG. 32 depicts a cross section of the invention of FIG. 31B along plane 32-32 of FIG. 31B.
Figure 33:
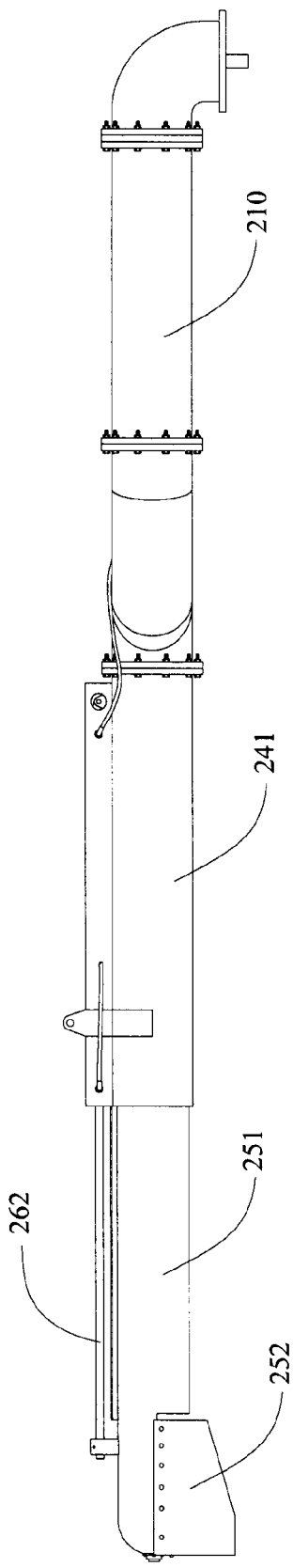
FIG. 33 depicts an elevation view of the right side of the invention of FIG. 31.
Figure 34:
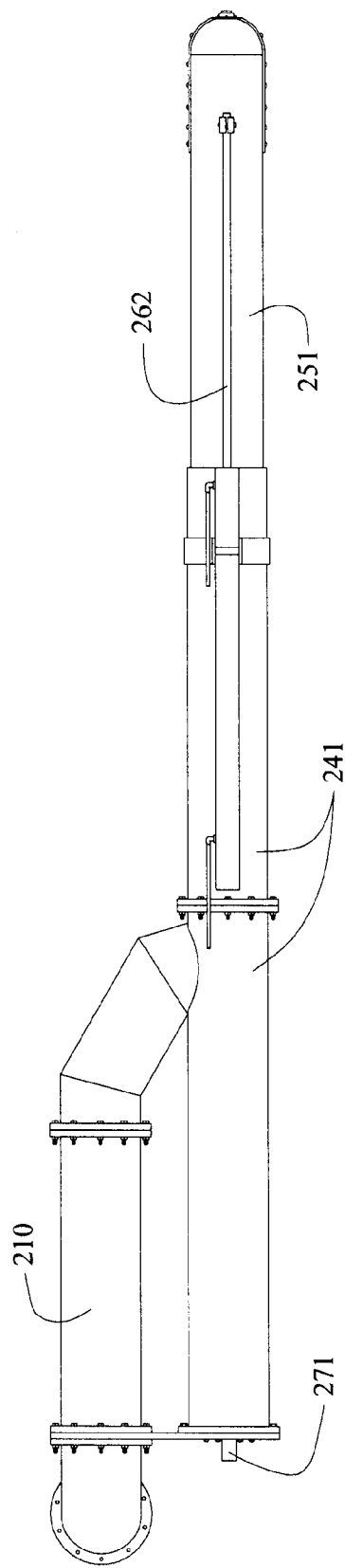
FIG. 34 depicts a top plan view of the invention of FIG. 31.
Figure 35:
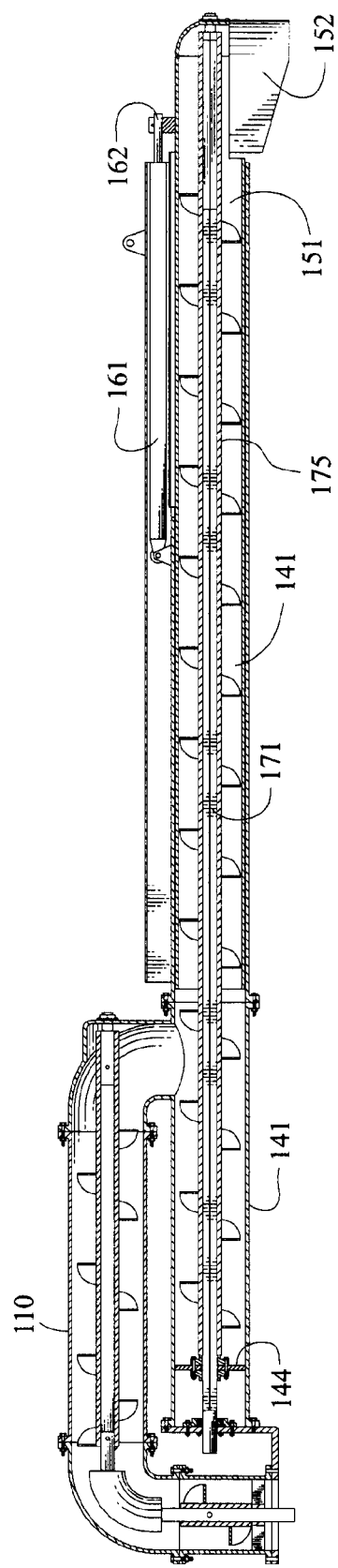
FIG. 35 depicts a longitudinal cross section of the left side elevation view of a variation of the invention of FIG. 1.

For the sake of simplicity and to give the claims of this patent application the broadest interpretation and construction possible, the following definitions will apply:

The term "inward" or derivative thereof essentially means toward an infeed end.

The term "outward" or derivative thereof essentially means toward an exit end.

The term "front" or derivative thereof essentially means toward the front of the combine or the infeed end of the auger casing.

The term "rear" or derivative thereof essentially means toward the exit end of the auger casing.

The term "left" or derivative thereof essentially means toward the left, or driver's side of the combine.

The term "right" or derivative thereof essentially means toward the right side of the combine.

However, such terminology is used only as a convenient reference point, to the extent that it is not functionally limiting or narrowing. Also for the sake of simplicity, the conjunctive "and" may also be taken to include the disjunctive "or," and vice versa, whenever necessary to give the claims herein the broadest interpretation and construction possible. Likewise, when the plural form is used, it may be taken to include the singular form, and vice versa.

The invention disclosed herein is not limited by construction materials to the extent that such materials satisfy the structural and/or functional requirements of any claim. For example, although the screw thread sleeve may be fabricated using steel or other metals or alloys, it may also be fabricated using plastics and/or other polymeric materials, or any materials that satisfy the structural and/or functional requirements.

The most general form of the invention disclosed herein includes (comprises) an improved extendable conveyor, comprising an auger casing having an infeed end and an opposite exit end. The casing includes a telescoping extendable section and support section. The extendable section includes the exit end and an inward end; the support section includes the infeed end, and a outward end toward the exit end of the extendable section of the casing. The telescoping extension of the auger may be accomplished by the extendable section being telescopically received within the support section, and slidably extending outward from the outward end of the support section. Alternatively, the telescoping may be accomplished by the extendable section telescopically receiving the support section, and slidably extending outward from the outward end. Ideally for support purposes, the inward half of the extendable section will overlap with the outward half of the support section of the casing, to adequately support the weight of the exit end of the extendable section (plus any items being conveyed) when the auger is in its fully extended configuration.

In its fully retracted configuration, the casing sections house or enclose the essentially horizontal transport auger comprising a rotary drive shaft (having a non-round cross section) mechanically linked to a rotary drive means; the drive shaft essentially extends outward within the casing, from the infeed end (at or near its linkage to the rotary drive means) to its tip near the outward end of the support section of the casing. The auger further includes a sleeve having one or more outstanding screw threads, the rotation of which (around the drive shaft) causes the transport of the items. The sleeve includes a central longitudinal cavity sized to snugly receive the drive shaft, while remaining slidable outward and inward along the drive shaft. Although the screw thread sleeve is slidable axially along the drive shaft, the non-circular cross section of the drive shaft will impart its rotary force to the screw thread sleeve snugly embracing the drive shaft, regardless of where along the drive shaft the screw thread sleeve happens to be situated. The cross section of the drive shaft may be square, rectangular, hexagonal, octagonal, triangular, oval, splined or virtually any configuration other than purely circular, so long as the central longitudinal cavity of the screw thread sleeve is configured to snugly accept enough of the drive shaft surface to rotate as the drive shaft rotates, no matter where along the drive shaft the screw thread sleeve happens to be located at the time of rotation.

The support section also includes an infeed port intermediate between the infeed end and the outward end of the support section of the casing. The infeed port is essentially a portal on the stationary support section of the auger casing; transportable items (conveyed from a bin or other storage area) are introduced to the feeder conveyor of the present invention, which in turn transports those items to the infeed port, introducing such items to the screw thread auger conveyor of the present invention. The infeed port must be situated to always feed transportable items to the screw thread region of the auger, regardless of whether the extendable section (with its attached screw thread auger) is fully extended. The infeed port is usually located far enough outward along the support casing to provide infeed when the extendable section is fully extended. Accordingly, the infeed port is usually distanced from the infeed end just less than a maximum amount of extension to be provided by the telescoping casing sections. For example, if both the support section and the extendable section of casing are nineteen (19) feet long, and the auger drive shaft is nineteen and one-half (19½) feet long, the infeed port ideally will be no more than six (6) to eight (8) feet from the infeed end of the support section of the casing. The infeed port may be situated on the top of the support section, or the infeed port may be situated on the underside of the support section; alternatively, the infeed port may be situated on a lateral side of the support section.

In a preferred example, the length of telescopic overlapping of the support section and the extendable section of the casing in its fully extended configuration should be approximately one-third (⅓) of the length of the extendable section; the inward one-third (⅓) of the extendable section should be supported by a corresponding length of the outward end of the support section, with the remaining two-thirds (⅔) of the extendable section being extending out the outward end of the support section.

Another feature of the invention includes (comprises) the sleeve having a bearing end devoid of the outstanding screw thread. This embodiment also includes a bearing collar for supporting the inner end of screw thread sleeve, especially when the extendable section of the casing (with its accompanying screw thread sleeve) slide outward along the drive shaft to extend the auger conveyor. The bearing collar may have an outer perimeter in close slidable contact with the support section of the casing; the bearing collar may essentially resemble a doughnut, having a central aperture sized to snugly receive the sleeve bearing end, which is rotatable within the central aperture of the bearing collar. However, the bearing collar remains slidable (with the sleeve) along the drive shaft. The bearing collar also serves to reduce vibration of the encased auger.

In an alternative embodiment, the bearing collar may be affixed to the sleeve bearing end, so that it rotates with the screw thread sleeve as the drive shaft rotates. This feature may enhance the cleaning of the inner walls of the casing. The bearing collar perimeter may also include brush bristles, to further enhance the cleaning of the inner casing walls.

In another alternative embodiment, the telescoping further includes a mechanical means of telescoping. Such means of telescoping are well known in the field, and especially may be selected from the group consisting of hydraulic cylinder with rod, a pneumatic cylinders with rod, pulley systems (not shown), rack and pinion systems (not shown) and electric screw drive shaft systems (not shown), and combinations thereof. Especially useful is a means of telescoping comprising a hydraulic cylinder with rod. The hydraulic cylinder is anchored to or near the support section of casing, and its outwardly telescoping rod has an outermost end mounted to or near the exit end of the extendable section of casing. Activation of the hydraulic cylinder will cause extension of the extendable end the distance desire by the operator (within the physical range of the conveyor).

To facilitate such slidable extension, the upper surface of the extendable section of auger casing may further include an upstanding T-ridge having a uppermost arms slidably received within a downstanding C-bracket. There may be a longitudinal slot along the top surface of the support section, toward and near its outward end, which may be bridged by a down-opening C-bracket or C-channel. The T-ridge may have an upright portion slidably received with said slot and having uppermost arms captured by said downstanding C-bracket.

The invention may further include a feeder conveyor feeding transportable items to (and through) the infeed port, or any other features of a combine or other vehicle used in conjunction with the conveyor. Such feeder conveyors are known in the field, and the feeder conveyor may especially be selected from the group consisting of auger conveyors (10), chain-and-paddle conveyors, and vacuum system conveyors, and combinations thereof. They typically include a relatively short section of tubing or similar casing, housing the feeder conveyor system. And the feeder conveyor system is often supplied with transportable items by another conveyor system, often extending from a bin or similar storage area to the feeder conveyor.

One specific version of the invention includes an improved extendable offloading conveyor, comprising:

(a) an auger casing having an infeed end and an opposite exit end, the casing comprising an extendable section (51) having an exit end (52) and being telescopically received within a support section (41) having an infeed end, the casing sections mechanically linked by a telescoping means comprising a hydraulic cylinder (61) attached to the support section and an extension rod (62) extendable from the hydraulic cylinder and attached to the extendable section, the support section including an infeed port atop the support section and distanced from the infeed end just less than a maximum amount of extension to be provided by the telescoping, the support section further comprising a outward end, the extendable section slidably extendable outward from the outward end, the casing encasing an essentially horizontal transport auger, (b) said transport auger comprising a rotary drive shaft, having a non-round cross section (71), mechanically linked to a rotary drive means and extending within the casing from the infeed end to a tip near the exit end, the auger further comprising an outstanding screw thread sleeve (75) defining a central longitudinal cavity sized to snugly receive the drive shaft and slidable thereon, the sleeve having a journal end rotatably captured by the exit end of the extendable section, and an opposite bearing end devoid of the outstanding screw thread and further comprising a bearing collar (44) having an outer perimeter in close slidable contact with the casing, the bearing collar defining a central aperture sized to snugly receive the sleeve bearing end rotatable therein, the bearing collar slidable with the sleeve along the drive shaft.

(c) the telescoping by the hydraulic cylinder and extension rod extending the casing extendable end and slidably extending the auger sleeve outward on the rotary drive shaft, thereby lengthening the auger beyond the drive shaft.

In another version, the support section of casing is approximately seventeen (17) feet long (from inward end to outward end), and the auger drive shaft is approximately sixteen (16) feet long. The extendable section of casing is approximately twelve (12) feet long (including the exit spout of about two (2) feet in length), and the screw thread auger is approximately eighteen (18) feet long (from exit end to inward end). In its fully retracted configuration, the casing is approximately nineteen (19) feet long, comprised of the 17-foot long support section plus the 2-foot long exit spout of the extendable section; the infeed port is situated approximately five (5) to six (6) feet from the inward end of the support section, whereas the bearing collar at the inward end of the screw thread sleeve is situated near the inward end of the support section. The extendable section extends a maximum of approximately an additional six (6) feet out the outward end of the support section, the remainder of the extendable section being supported telescopically within the support section of casing. That approximately 6-foot extension of the extendable section likewise moves the screw thread sleeve a corresponding distance outward along the drive shaft, with the bearing collar before it gets to the infeed port.

The invention may also include a combine with an improved extendable offloading conveyor comprising a combine having a feeder bin emptied by a feeder conveyor feeding transportable items to an improved extendable conveyor described above.

Besides the improve conveyor and combine disclosed herein, the invention also includes a method of using an invention described herein. One general version of the method includes the steps of mechanically linking (to a rotary drive means) an improved conveyor described above.

Another method of using an extendable conveyor described herein further includes the steps of:

(a) actuating a feeder conveyor emptying a bin, as well as the extendable conveyor; and (b) extending said extendable conveyor while said extendable conveyor is operating; or (c) retracting said extendable conveyor while said extendable conveyor is operating.

Those skilled in the art who have the benefit of this disclosure will appreciate that it may be used as the creative basis for designing devices or methods similar to those disclosed herein, or to design improvements to the invention disclosed herein; such new or improved creations should be recognized as dependant upon the invention disclosed herein, to the extent of such reliance upon this disclosure.

I claim:

1. An improved extendable conveyor for use with a combine having rotary drive means, comprising:

(a) an auger casing having an infeed end and an opposite exit end, said casing comprising a telescoping extendable section and support section, said extendable section including said exit end, said support section including said infeed end and an infeed port distanced from said infeed end just less than a maximum amount of extension to be provided by said telescoping, said casing encasing an essentially horizontal transport auger;

(b) said transport auger comprising a rotary drive shaft, having a non-round cross section, mechanically linked to the rotary drive means of the combine and extending within said casing from said infeed end to a tip near said exit end, said auger further comprising an outstanding screw thread sleeve defining a central longitudinal cavity sized to snugly receive said drive shaft and slidable thereon.

2. An improved extendable conveyor described in claim 1 above, said sleeve having a bearing end devoid of said outstanding screw thread, and further comprising a bearing collar having an outer perimeter in close slidable contact with said casing, said bearing collar defining a central aperture sized to snugly receive said sleeve bearing end rotatable therein, said bearing collar slidable with said sleeve along said drive shaft.

3. An improved extendable conveyor described in claim 2 above, said bearing collar affixed to said sleeve bearing end and rotatable by the sleeve bearing.

4. An improved extendable conveyor described in claim 3 above, said bearing collar perimeter including brush bristles.

5. An improved extendable conveyor described in claim 1 above, said support section further comprising an outward end, said telescoping comprising said extendable section telescopically received within said support section and slidably extendable outward from said outward end.

6. An improved extendable conveyor described in claim 1 above, said support section further comprising an outward end, said telescoping comprising said extendable section telescopically received over said support section and slidably extendable outward from said outward end.

7. An improved extendable conveyor described in claim 1 above, said infeed port situated on the top of said support section.

8. An improved extendable conveyor described in claim 1 above, said infeed port situated on the underside of said support section.

9. An improved extendable conveyor described in claim 1 above, said infeed port situated on a lateral side of said support section.

10. An improved extendable conveyor described in claim 1 above, said telescoping further comprising actuation by a mechanically powered means of telescoping.

11. An improved extendable conveyor described in claim 10 above, said means of telescoping selected from the group consisting of a telescoping actuation means such as a hydraulic cylinder with rod, a pneumatic cylinder with rod, pulley systems, rack and pinion systems, and electric screw drive shaft systems, and combinations thereof.

12. An improved extendable conveyor described in claim 10 above, said means of telescoping comprising a hydraulic cylinder with rod.

13. An improved extendable conveyor described in claim 10 above, said support section further comprising an apical slot near its outward end and bridged by a down-opening C-channel, said extendable section further comprising an upstanding T-ridge having an upright portion slidably received with said slot and having uppermost arms captured by said down-opening C-channel.

14. An improved extendable conveyor described in claim 1 above, further comprising a feeder conveyor feeding transportable items through said infeed port.

15. An improved extendable conveyor described in claim 14 above, said feeder conveyor selected from the group consisting of auger conveyors, chain-and-paddle conveyors, and vacuum system conveyors, and combinations thereof.

16. An improved extendable conveyor described in claim 15 above, further comprising the combine having a feeder bin with a transport system cooperatively related to said feeder conveyor.

17. The combine in combination with the improved extendable conveyor described in claim 1 above.

18. An improved extendable offloading conveyor for use with a combine having rotary drive means, comprising:
  (a) an auger casing having an infeed end and an opposite exit end, said casing comprising an extendable section including said exit end and being telescopically received within a support section including said infeed end and an outward end, said casing sections mechanically linked by a telescoping means comprising a hydraulic cylinder attached to said support section and an extension rod telescopically extendable from and retractable into said hydraulic cylinder and attached to said extendable section, said support section including an infeed port atop said support section and distanced from said infeed end slightly less than a maximum amount of extension provided by said telescoping, said support section further comprising a outward end, said casing encasing an essentially horizontal transport auger;
  (b) said transport auger comprising a rotary drive shaft, having a non-round cross section, mechanically linked to the rotary drive means of the combine and extending within said casing from said infeed end to a tip near said outward end, said auger further comprising an outstanding screw thread sleeve defining a central longitudinal cavity sized to snugly receive said drive shaft and slidable thereon, said sleeve having a journal end rotatably captured by said exit end of said extendable section, and an opposite bearing end devoid of said outstanding screw thread and further comprising a bearing collar having an outer perimeter in close slidable contact with said casing, said bearing collar defining a central aperture sized to snugly receive said sleeve bearing end rotatable therein, said bearing collar slidable with said sleeve along said drive shaft,
  (c) said telescoping by said hydraulic cylinder and extension rod extending said casing extendable end and thereby slidably extending said auger sleeve outward on said rotary drive shaft, thereby lengthening said auger beyond said drive shaft.

19. A method of using an extendable conveyor for use with a combine having rotary drive means, comprising the steps of:
  (a) mechanically linking, to the rotary drive means, an improved extendable conveyor comprising an auger casing having an infeed end and opposite exit end, said casing comprising a telescopic extendable section and support section, said extendable section including said exit end, said support section including said infeed end and an infeed port distanced from said infeed end just less than a maximum amount of extension to be provided by said telescoping, said casing encasing an essentially horizontal transport auger; said transport auger comprising a rotary drive shaft, having a non-round cross section, mechanically linked to the rotary drive means of the combine and extending within said casing from said infeed end to a tip near said exit end, said auger further comprising an outstanding screw thread sleeve defining a central longitudinal cavity sized a snugly receive said drive shaft and slidable thereon:
  (b) actuating a feeder conveyor emptying a bin, as well as the extendable conveyor; and then either;
  (c) extending said extendable conveyor while said extendable conveyor is operating, or retracting said extendable conveyor while an extendable conveyor is operating.

* * * * *